(12) United States Patent
Cragun et al.

(10) Patent No.: US 11,288,633 B2
(45) Date of Patent: Mar. 29, 2022

(54) DOOR TO DOOR SALES MANAGEMENT TOOL

(71) Applicant: Vivint, Inc., Provo, UT (US)

(72) Inventors: Jason Cragun, Pleasant Grove, UT (US); Ryan Gee, Cedar Hills, UT (US); Lonnie Kyser, Pleasant Grove, UT (US)

(73) Assignee: VIVINT, INC., Provo, UT (US)

( * ) Notice: Subject to any disclaimer, the term of this patent is extended or adjusted under 35 U.S.C. 154(b) by 485 days.

(21) Appl. No.: 15/638,154

(22) Filed: Jun. 29, 2017

(65) Prior Publication Data

US 2017/0300860 A1  Oct. 19, 2017

Related U.S. Application Data

(63) Continuation-in-part of application No. 14/335,772, filed on Jul. 18, 2014, now Pat. No. 10,963,840, (Continued)

(51) Int. Cl.
*G06Q 10/10* (2012.01)
*G06Q 30/02* (2012.01)
(Continued)

(52) U.S. Cl.
CPC ... *G06Q 10/103* (2013.01); *G06Q 10/063118* (2013.01); *G06Q 30/02* (2013.01); *G06Q 30/0202* (2013.01); *G06Q 30/0204* (2013.01); *G06Q 30/0205* (2013.01); *G06F 3/048* (2013.01)

(58) Field of Classification Search
None
See application file for complete search history.

(56) References Cited

U.S. PATENT DOCUMENTS

| 6,078,892 A | 6/2000 | Anderson |
| 6,125,356 A | 9/2000 | Brockman et al. |

(Continued)

FOREIGN PATENT DOCUMENTS

| JP | 62-087492 | 4/1987 |
| KR | 10-2006-0065399 | 6/2006 |
| KR | 10-0856109 | 8/2008 |

OTHER PUBLICATIONS

U.S. Appl. No. 14/335,772, filed Jan. 11, 2019, Office Action.
(Continued)

*Primary Examiner* — Ivan R Goldberg
(74) *Attorney, Agent, or Firm* — Kunzler Bean & Adamson, PC

(57) ABSTRACT

A door to door sales management tool utilizes a computer system for visually dividing geographic areas among sales teams. The system can be configured to display on a digital interface a visual depiction of a map. The system can also be configured to receive one or more indications defining boundaries of a first geographic area within the map. The system can assign a first user to the first geographic area. Assigning the first user to the first geographic area can comprises receiving a physical association of a visual indicator representative of the first user with a visual indicator representative of the first geographic area through a touch interface.

9 Claims, 39 Drawing Sheets

Related U.S. Application Data which is a continuation of application No. 13/026,468, filed on Feb. 14, 2011, now Pat. No. 8,812,345.

(60) Provisional application No. 61/320,641, filed on Apr. 2, 2010.

(51) Int. Cl.
  *G06Q 10/06* (2012.01)
  *G06F 3/048* (2013.01)

(56) References Cited

U.S. PATENT DOCUMENTS

| | | |
|---|---|---|
| 7,620,564 B1 | 11/2009 | Lippock |
| 8,433,650 B1 | 4/2013 | Neil |
| 8,812,345 B2 | 8/2014 | Cragun |
| 2002/0035504 A1 | 3/2002 | Dver |
| 2002/0082892 A1* | 6/2002 | Raffel ............ G06Q 10/063 705/7.26 |
| 2002/0143609 A1 | 10/2002 | Magouirk |
| 2003/0078788 A1 | 4/2003 | Sussman et al. |
| 2003/0135402 A1* | 7/2003 | Moore ............ G06Q 10/063 705/7.13 |
| 2003/0200192 A1 | 10/2003 | Bell |
| 2005/0114197 A1 | 5/2005 | Bell |
| 2005/0192831 A1 | 9/2005 | Ellison |
| 2006/0007174 A1* | 1/2006 | Shen ............ G06F 3/04855 345/173 |
| 2006/0074775 A1 | 4/2006 | Roman et al. |
| 2006/0101005 A1 | 5/2006 | Yang et al. |
| 2006/0200383 A1* | 9/2006 | Arutunian ............ G06Q 30/02 705/14.56 |
| 2006/0242024 A1* | 10/2006 | Mattingly ............ G06Q 30/02 705/14.41 |
| 2007/0129954 A1 | 6/2007 | Dessureault |
| 2007/0152041 A1 | 7/2007 | Hawkins |
| 2007/0219712 A1 | 9/2007 | Vasant |
| 2007/0229466 A1* | 10/2007 | Peng ............ G06F 3/044 345/173 |
| 2007/0282650 A1 | 12/2007 | Jackness |
| 2008/0126244 A1 | 5/2008 | Loving |
| 2009/0254971 A1 | 10/2009 | Herz |
| 2009/0322782 A1 | 12/2009 | Kimchi |
| 2011/0040698 A1* | 2/2011 | Chang ............ G06Q 10/06 705/348 |
| 2011/0224896 A1* | 9/2011 | Napieraj ............ G06F 3/0488 701/532 |
| 2013/0117333 A1* | 5/2013 | Chmiel ............ G06Q 30/0201 707/803 |
| 2013/0262528 A1* | 10/2013 | Foit ............ G06Q 30/06 707/805 |
| 2013/0325553 A1* | 12/2013 | Nadiadi ............ G06Q 30/0205 705/7.34 |
| 2015/0051835 A1* | 2/2015 | Jung ............ G01C 21/3664 701/533 |
| 2015/0142517 A1 | 5/2015 | Crugan |
| 2015/0371158 A1* | 12/2015 | Oberweis ............ G06Q 10/067 705/348 |
| 2016/0098598 A1* | 4/2016 | Pahwa ............ G01C 21/32 382/113 |
| 2021/0142289 A1 | 5/2021 | Crugan et al. |

OTHER PUBLICATIONS

U.S. Appl. No. 14/335,772, filed Sep. 12, 2018, Final Office Action.
U.S. Appl. No. 14/335,772, filed Jan. 12, 2018, Office Action.
Saito et al., "Coloration of Sapphire by Metal Ion Implantation," Japanese Journal of Applies Physics, vol. 24, No. 11, Nov. 1985, pp. L880-L882.
Saito et al., "Coloraiton of Sapphire by Co Ion Implantation," Nuclear Instruments and Methods in Physics Reasearch B59/60, 1991, pp. 1173-1176.
Marques et al., "Optical Changes Induced by High Fluence Implantation of Au Ions on Sapphire," Nuclear Instruments and Methods in Physics Research B218, 2004, pp. 139-144.
Alves et al., "Structural and Optical Studes of Co and Ti Implanted Sapphire," Nuclear Instruments and Methods in Physics Research B 207, 2003, pp. 55-62.
U.S. Appl. No. 13/026,468, filed Nov. 9, 2012, Office Action.
U.S. Appl. No. 13/026,468, Apr. 30, 2013, Final Office Action.
U.S. Appl. No. 13/026,468, Dec. 23, 2013, Office Action.
U.S. Appl. No. 13/026,468, May 6, 2014, Notice of Allowance.
U.S. Appl. No. 14/335,772, Nov. 12, 2015, Office Action.
U.S. Appl. No. 14/335,772, Jun. 29, 2016, Office Action.
U.S. Appl. No. 14/335,772, Mar. 2, 2017, Office Action.
BenMoussa, "Supporting Salespersons through Location Based Mobile Applications and Services", in Building the E-Service Society, 204, Springer, pp. 149-167.
U.S. Appl. No. 14/335,772, Aug. 5, 2019, Notice of Allowance.

\* cited by examiner

| | |
|---|---:|
| 1160 — Total Doors | 453 |
| 1170 — Doors Answered | 211 |
| 1180 — Qualified | 186 |
| 1190 — Qualified Rate | 41.1% |
| 1200 — Sales | 113 |
| 1210 — Credits | 26 |
| 1220 — Credits Per Sale | 0.23 |
| 1230 — Passing Credits | 14 |
| 1240 — Credit Pass Rate | 53.8% |
| 1250 — Gross Close Rate | 24.9% |
| 1260 — Net Close Rate | 53.6% |
| 1270 — Qualified Close Rate | 60.8% |

DOOR TO DOOR SALES MANAGEMENT TOOL

CROSS-REFERENCE TO RELATED APPLICATIONS

This application is a continuation-in-part of U.S. patent application Ser. No. 14/335,772 filed on Jul. 18, 2014, entitled "DOOR TO DOOR SALES MANAGEMENT TOOL", which application is a continuation of U.S. patent application Ser. No. 13/026,468 filed on Feb. 14, 2011, entitled "DOOR TO DOOR SALES MANAGEMENT TOOL", which application claims the benefit of and priority to, U.S. Provisional Application Ser. No. 61/320,641, filed on Apr. 2, 2010, entitled "SALES MANAGEMENT TOOL". All of the aforementioned applications are incorporated by reference herein in their entirety.

BACKGROUND OF THE INVENTION

1. The Field of the Invention

The present invention relates to door to door sales management. More specifically, the present invention relates to sales prediction, qualification and productivity through sales database enrichment in door to door sales management.

2. The Relevant Technology

Door to door sales responsibilities are generally separated into geographic regions. Once fully subdivided, each geographical area is given to a sales team. The sales team then gives each salesperson a street or set of streets to work until complete. As there are a finite number of doors, it becomes important to contact as many of the people as possible without becoming a nuisance. Therefore it is important for management to know which houses have been contacted and which have not.

Door to door salespeople, however, have a more immediate motivation to sell. Paperwork is often seen as "in the way" or unimportant compared with moving along to the next door. After all, they will likely receive a new neighborhood to work on after this one has been finished. There is little motivation to provide records that may help the next salesperson through the current neighborhood.

The door to door sales process can be filled with frustrations. A potential customer may fail the credit check at the end of the sales call. Another potential customer may still be under a contract with another company. The current street may have been contacted in the last few months. Most of these frustrations equate with time wasted on poor sales prospects.

Frequently, door to door salespeople use paper to track their contacts. However, paper records are often difficult to read, difficult to review, time consuming to procure, and even contain misstatements. Even when management requires use of the paper records, the records may be filled out at the end of the day with guesses of what happened earlier that morning. The value of the paperwork is not directly related to the motivation of the door to door salesperson's next sale and therefore is given less attention than management would like.

Even with a good paper listing, management must take individual salesperson daily records and compile them into useful information. Not only is this time intensive work, but each salesperson's report is likely to be subjective at best, and fabricated at worst, such that the report must be interpreted by the person compiling the records. This time and fabrication barrier is likely the same barrier to having a salesperson review neighborhood records before selling in that neighborhood.

SUMMARY OF THE INVENTION

Sales management tools and related methods are disclosed which improve the door to door selling process and/or the process of collecting information for future attempts.

In some embodiments, a door to door sales management tool utilizes a computer system for visually dividing geographic areas among sales teams. The system can be configured to display on a digital interface a visual depiction of a map. The system can also be configured to receive one or more indications defining boundaries of a first geographic area within the map. The system can assign a first user to the first geographic area. Assigning the first user to the first geographic area can comprises receiving a physical association of a visual indicator representative of the first user with a visual indicator representative of the first geographic area through a touch interface.

In some embodiments, a door to door sales management tool utilizes a computer system for visually dividing geographic areas among sales teams. The system can be configured to display on a digital interface a visual depiction of a map. The system can also be configured to receive one or more indications defining boundaries of a first geographic area within the map. The system can assign a first user to the first geographic area.

Assigning the first user to the first geographic area can comprise receiving a physical association of a visual indicator representative of the first user with a visual indicator representative of the first geographic area through a touch interface. The system can access a permission attribute that is associated with a user account of the first user. Further the system can configuring the permission attribute to give the first user editing rights for the first geographic area. The editing rights allow the first user to further sub-divide the first geographic area and assign a second user to the respective sub-divisions. The system can also assign the second user to the first geographic area, wherein the second user is not given editing rights for the first geographic area.

In some embodiments, a door to door sales management tools can also perform a method for visually dividing geographic areas among sales teams. The method can comprise an act of displaying on a touch-sensitive digital interface a visual depiction of a map. Additionally, the method can comprise an act of detecting multiple physical interactions with the touch-sensitive digital interface. The multiple physical interactions can define a boundary around a particular geographic area depicted by the map. Additionally, each interaction of the multiple physical interactions can be associated with an intensity variable indicating an intensity of the physical interaction.

The method can further comprise an act of rendering on the visual depiction of the map a boundary that encompasses the particular geographic area depicted by the map. Further, the method can comprise an act of assigning a first user to the particular geographic area. Assigning the first user to the particular geographic area can comprise physically associating a visual indicator representative of the first user with a visual indicator representative of the particular geographic area through a touch interface.

These and other aspects of embodiments of sales management tools and related methods are realized in a sales management tool as shown and described in the following figures and related description.

BRIEF DESCRIPTION OF THE DRAWINGS

Various embodiments are shown and described in reference to the numbered drawings, wherein:

FIG. 28 shows a screens hot of a overall report screen of a sales management tool;

It will be appreciated that the drawings are illustrative arid not limiting of the scope of the invention which is defined by the appended claims. The embodiments shown accomplish various aspects and objects. It is appreciated that it is not possible to clearly show each element and aspect of all possible embodiments in a single figure, and as such, multiple figures are presented to separately illustrate various details of individual embodiments of sales management tools and related methods of use in greater clarity. Similarly, not every embodiment need accomplish all ad vantages or include each detail of the various embodiments contemplated and disclosed herein.

DETAILED DESCRIPTION

Sales management tools and related methods of use will now be discussed in reference to the Figures provided. The drawings and descriptions are exemplary of various embodiments and are not intended to narrow the scope of the appended claims. While the application below discusses sales tools in terms of a residential neighborhood, it is understood that sales tools may be equally applicable in other situations, including commercial, non-profit and emergency response aspects.

Figure 1:
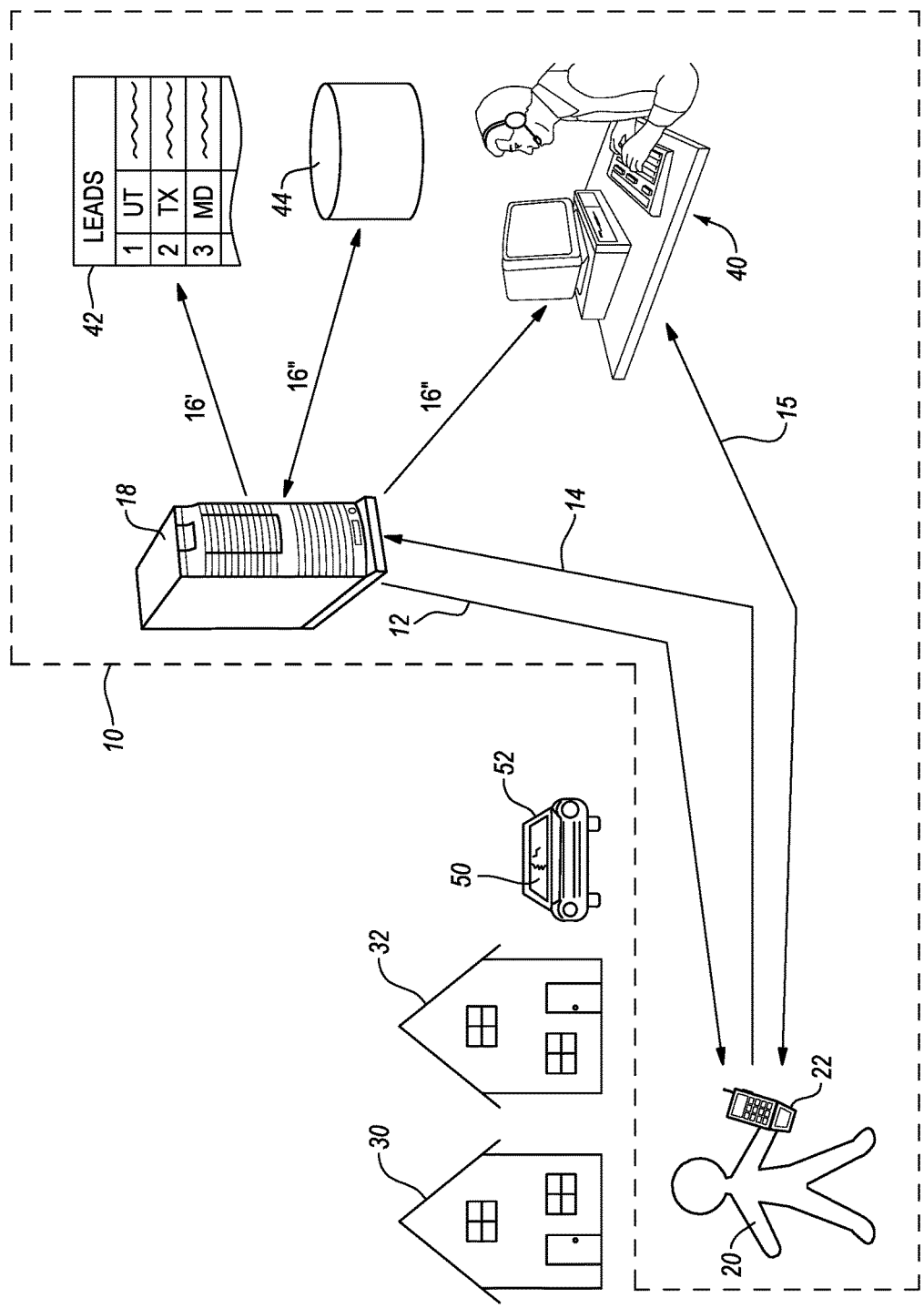
FIG. 1 shows a diagram of one embodiment of a sales management tool in use.

Turning now to FIG. 1, a diagram of the sales management tool 10 in use is shown. Central service 18 provides information (as shown by line 12) about a next sales call to salesperson 20 and surveys salesperson about homes 30 and 32 and the visit(s) (as shown by line 14). The information is routed to the appropriate storage and/or action queue (as shown by lines 16', 16" and 16'"). The new data is also marked as field verified, such that the system may track data freshness and accuracy.

In one embodiment, salesperson 20 approaches home 30 in a neighborhood. Through mobile device 22, the salesperson 20 views a map of the area which may rate houses by potential for a sale. The salesman may tap on a home on the map and thereby request information about home 30 and its expected occupants from central service 18. Central service 18 retrieves information about home 30 and its expected occupants and returns it to salesperson 20. During the visit to home 30 and the residents within, salesperson 20 may pre-qualify the residents using the information about the home 30 and its occupants retrieved earlier, receive supporting data such as other current accounts for reference, record inspection data related to ancillary products and services that may be appropriate to offer the residents of home 30, or even close the sale—all from their mobile device 22. After the visit is almost complete or complete, salesperson 20 may send the collected data to central service 18. If salesperson 20 was successful, an entity, such as call center 40, may make appropriate action, such as a communication (as shown by line 15) to follow up on the sale. If ancillary products or services were available for specific offer by salesperson 20, the results of the offers may be returned to central service 18 as well.

The inspection, while tangential to the main sales call, may have value external to the company in terms of leads, partner sales, aggregate data or other external information need. This information may include such things as business leads 42, such as evidence of broken windshield 50 on a car 52 for a windshield repair company. The information may include demographic information stored in database 44, which may be useful to a marketing company. The information may also include antenna information such that salesperson 20 may offer a special on satellite TV on behalf of a partner based on the lack of a satellite antenna on home 30. Thus, the inspections may include information that is useful to parties that partner with the sales company or may be valuable in other ways. As salesperson 20 may benefit from the value of the data, it is in his best interest to give good information.

Salesperson's 20 mobile device 22 software may be set up such that once the request for information about home 30 has been made, the software may not continue further until a report has been filled out. The report may include an inspection report, the result of the sale, and other data observable by the salesperson. Once complete, the software may allow the next home report to be accessed and salesperson 20 may be credited with the contact and any accompanying sale. The software may also use location finding, such as a GPS, to aid in determining the next address for the report request.

The sales management tool may save a salesperson effort and time. For instance, many companies require that a potential customer be pre-qualified in the form of a credit score, such as a FICO® score by Fair Isaac Corporation. In one embodiment, the salesperson 20 may confirm the identity of the people living in the home corresponds to the data retrieved from the database and request a pre-qualification. In fact, the pre-qualification may simply require selecting a house on a map and confirming the resident's name. If the pre-qualification fails, the salesperson may quickly end the sales call and move on to the next home. If the pre-qualification passes, the salesperson 20 may place more effort into the sales call, knowing that the sale may be closed. In another embodiment, the sales person is given a list of nearby current accounts. The sales person may then use the information in their sales pitch to help reduce the customer's resistance to purchase. Thus, by reducing the amount of data input, providing more information to the salesperson 20 earlier in the sales process, the sales management tool becomes valuable to the salesperson 20.

By providing useful information and tools to the salesperson 20, the salesperson has an interest in pulling the next home report. By requiring a survey that may lead to rewards (such as a list of houses recently contacted) and allow access to his next report, the salesperson 20 will likely have an interest in filling out a correct report. Similarly, the salesperson 20 will likely put in the correct information because he depends on the same database information to make his sales calls and to receive credit for visits. As result of the self-interest of the salesperson 20, the data sent by the salesperson is fresh and observed and will be marked as field verified.

Once the sales call data is stored in central service 18, the data may be routed to areas based on its use. Successful sales data may be routed to call center 40, where the salesperson 20 or resident of the home will make preparations to finalize the sale, if more action is required. Potential leads 42 may be sorted and sent to appropriate partners or aggregated for later use.

Figure 2:
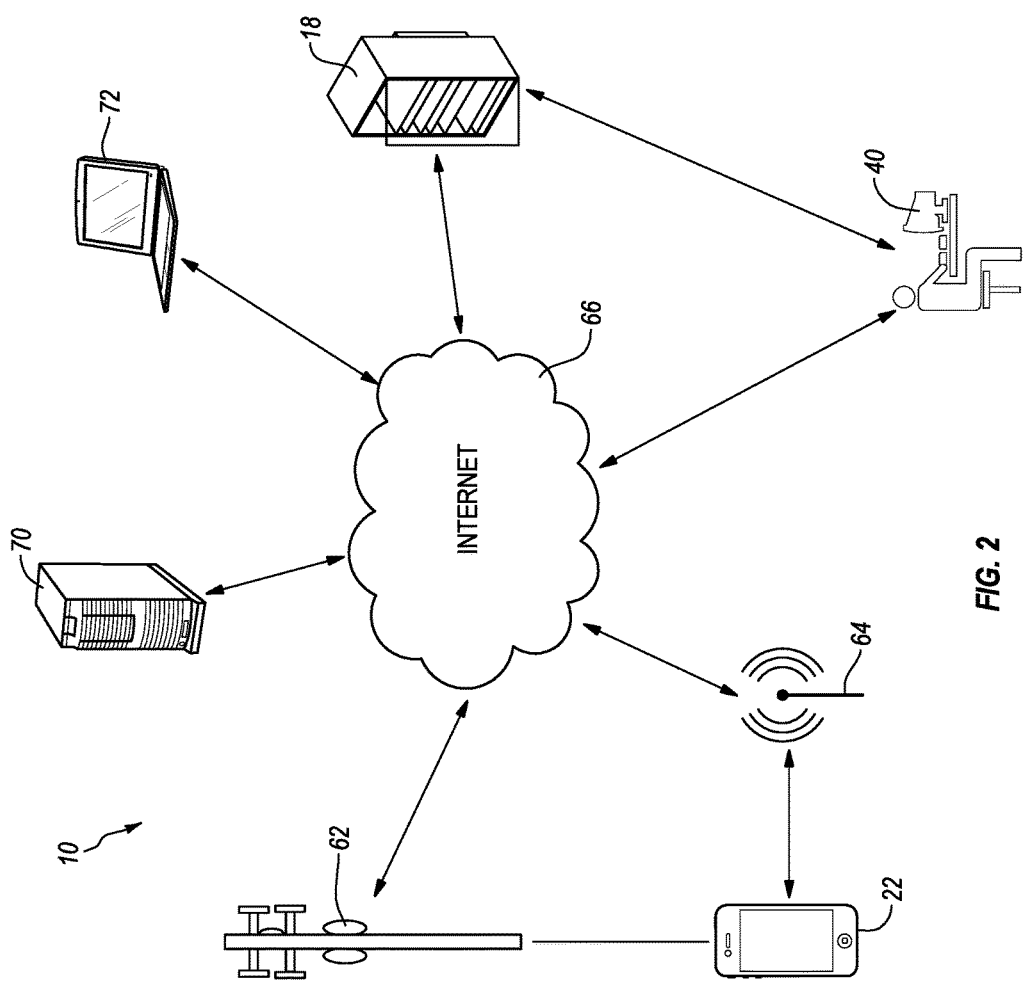
FIG. 2 shows a communication diagram of one embodiment of a sales management tool in use.

Turning now to FIG. 2, a communication diagram of sales management tool 10 is shown. Mobile device 22 communicates with cell tower 62 or other wireless access point 64 to access the Internet 66. The communication may then be routed to central service 18. In a similar way, central service 18 may communicate back to mobile device 22.

Central service 18 and mobile device 22 may also communicate with other systems to store and utilize the sales data. Call center 40 may monitor central service 18, receive messages about successful sales and organize call-backs to finalize the sale. Referral and lead generation data may be sent to other business servers 70 for their use. Management system 72 may monitor these transactions, system status of the various devices, status of the salespeople and run reports based on data stored in the central service 18.

Figure 3:
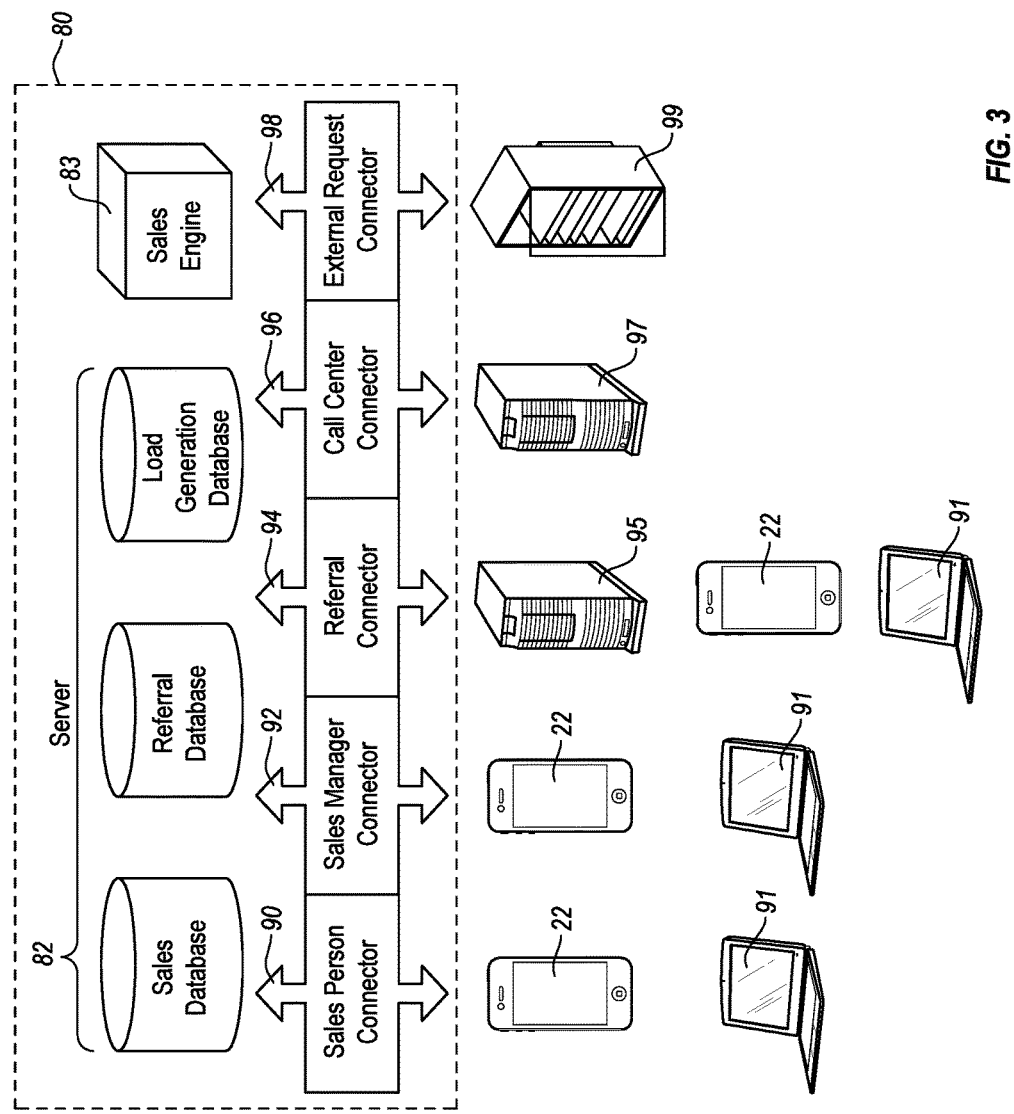
FIG. 3 shows a functional diagram of external connectors between a database server and external services.

Turning now to FIG. 3, a functional diagram of external connectors between server 80 and external services is shown. In one embodiment server 80 may include business logic that ties data requests and data reports to databases 82 and a sales engine 83. As the data need and protocols of the communication differs according to the purpose of the communication, the business logic connector may be tailored to each application.

Sales engine 83 may include logic to aid the success of salespeople and sales management. In one embodiment, the sales engine 83 may perform predictive analysis. The predictive analysis may process information in the databases 82 to discover commonalities between successful sales and unsuccessful sales. The system may identify specific characteristics, such as a section of a street that is more receptive to the sales than other customers (perhaps because the neighbors have discussed security). These potential sales may then be flagged and stored for salespeople in the area, including the commonality identified by the engine.

In other embodiments, the sales engine 83 may include external data sources in its decision making process. For instance, the sales engine may be connected to a data warehouse 85 (not shown) and perform a trending analysis over time. The trending analysis may show which neighborhoods are increasing security awareness and which neighborhoods are decreasing awareness, along with an expected date of best sales. In other embodiments, the sales engine may retrieve and digest public or private data. In one embodiment the sales engine uses public safety information, such as recent crime reports. Neighborhoods and streets may be targeted that have recently felt the effects of crime.

In other embodiments, the sales engine 83 may aid the sales manager in achieving higher sales. The sales engine 83 may match sales people with neighborhoods. In one embodiment, the sales engine may use past sales person successes and compare it with neighborhood socioeconomic factors. The engine may then suggest placement of the sales person with neighborhoods that appear the most comfortable and successful for that sales person, i.e. a member of a particular ethnicity in a neighborhood with a high concentration of that ethnicity, or a female in neighborhoods having demographics where female sales personnel have outsold their male counterparts.

In another aspect of the invention, the sales engine 83 may suggest neighborhoods based on past number of people home on that day of the week (or warn a sales manager of potential for no one to be home). For instance, the sales engine 83 may warn that an Irish neighborhood may not have the most effective sales on St. Patrick's Day based on past sales history.

While the sales engine 83 has been discussed as one object, it should be noted that the sales engine may be split into multiple, specific purpose engines.

As Sales person connector 90 has a purpose to connect the database requests and reports from salespeople to the databases and flag the results as field verified. These requests and reports may be from devices that include mobile devices 22, computers, laptops 91 and other portable devices that are accessible to salespeople in the field. Further details may be seen in FIGS. 4 and 5 and their corresponding descriptions.

Sales manager connector 92 has a purpose to allow a sales manager to manage her sales force. The requests and reports are likely to be from similar machines as the sales force. Further details may be seen in FIG. 6 and its corresponding description.

Referral connector 94 has a purpose to contact partners with sales and sales opportunities. This may be in the form of direct database server 80 to partner server 95 communication, emails, text messages, or an aggregation of information which is then transmitted to the partner. Immediate communication may be more appropriate when a salesperson has convinced the resident of the home to purchase a partner's product or services. Less immediate communication may be more appropriate when the information is more related to leads or demographics. Thus, the referral connector 94 may include logic to determine the immediacy of dispatching field verified data to partners.

Call center connector 96 has a purpose to route field verified data to a call center shortly after being sent by a salesperson. In one embodiment, a salesperson will make the sale to the resident of the home and then send the relevant data to the sales person connector 90. As the new data becomes available, the data may be routed through the call center connector to the call center servers 97. The new customer or salesperson may then be called, if further action is required. As the call center already has the data from the salesperson, the call may be completed more efficiently and quickly.

External request connector 99 has a purpose of retrieving and loading external data into the database server. In one embodiment, a salesperson requests information about residents of a house. If the data is not currently in the database, database server 80 may contact external data vendor 99 through external request connector 98 to populate the database with relevant information. The database server 80 may then send the information back to the salesperson through salesperson connector 90. Similarly, the external request connector may request prequalification from the credit bureaus, using information about the confirmed residents of a home. The resident's data may have been previously retrieved based on the address of a house selected by the salesperson.

While server 80 has been shown to be a single machine, it should be recognized that components of the software may run on separate machines or in a cluster or cloud setup. In one embodiment, the databases are hosted on a server that is separated from the connectors, such that the connector server serves as an intermediary between the database host and outside communications.

Figure 4:
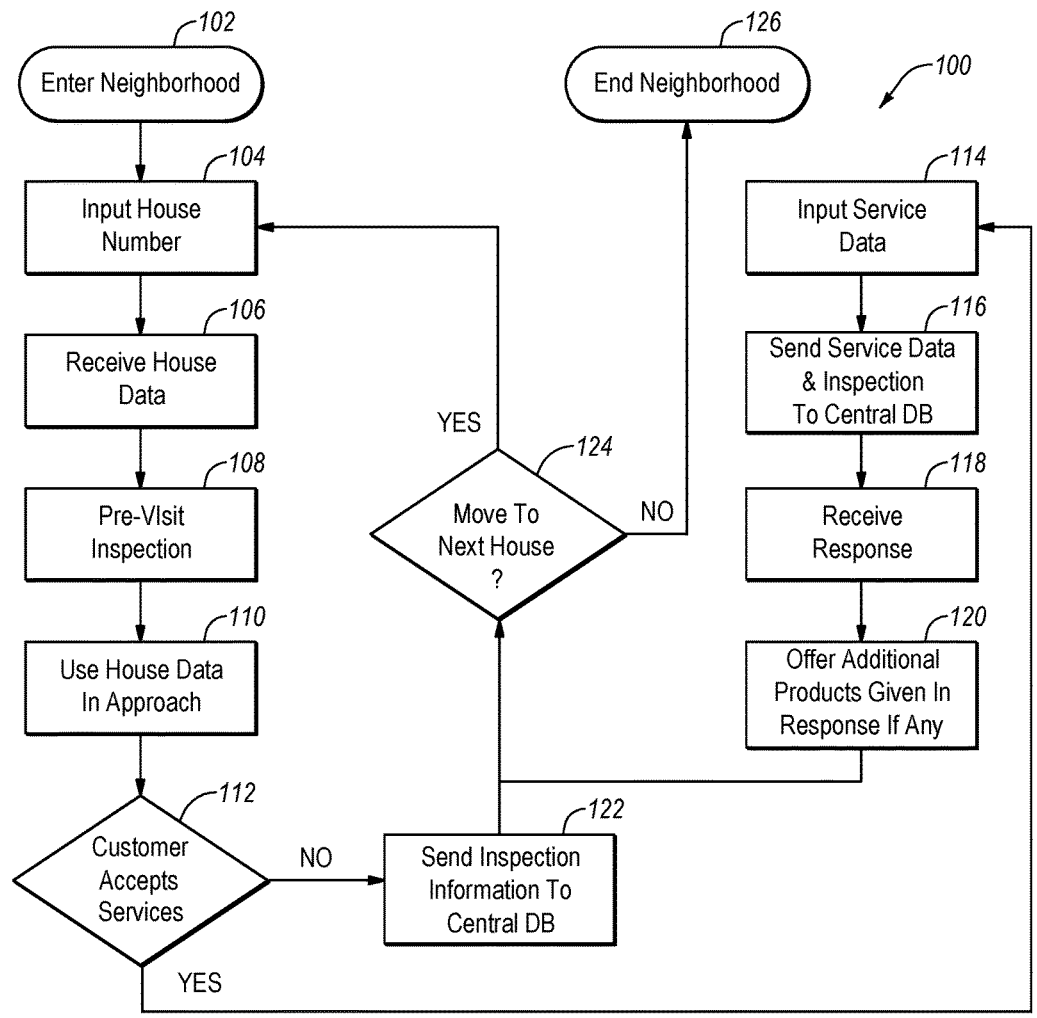
FIG. 4 shows a flowchart of a sales process using a sales management tool.

Turning now to FIG. 4, a sales process 100 using the sales management tool 10 is shown. In one embodiment, the salesperson enters neighborhood 102 at the beginning of her route. She inputs the first house number and street 104 and sends the input to the central service. The salesperson then receives house data 106 from the central service. The salesperson's device may then switch to a survey mode in which pre-visit inspection data may be entered 108. After having reviewed the house data, the salesperson may now custom tailor the sales approach using house data 110. The salesperson will then decide whether to continue the sale based on if the customer accepts the services or product 112. Part of that accepting services or product may include a pre-qualification.

If the customer accepts the sale, the salesperson proceeds with finalizing the sale. The salesperson may input more service data 114, and verify current information. This information may include payment information, contract information, special offers/discounts, and other information that may be required, helpful or tangential to the sale or partners. The service data and inspection data may then be forwarded to the central service 116, which may process any payments required or schedule any appointments. Based on the response received 118, the salesperson may follow up with any additional product or service offers received in the response 120. The salesperson may then choose whether to move to the next house 124 and input a house number 104 or end her sales process in the neighborhood 126.

Otherwise, if the customer does not accept the sale 122, the salesperson will send the inspection data and result of the sales call to the central database 122. The salesperson may then choose to move to the next house 124 and input the house number 104 or end her sales process in the neighborhood 126.

This embodiment has the advantage of sending field verified data to the central service 116. The data may be trusted because it was input when freshly in the mind of the sales person. The sales person has an incentive to provide the fresh data because she knows that her manager may monitor the times between submitting the data (avoiding fraudulently created paper reports done well after the alleged sales attempt). She is further incentivized because any leads generated by her report may earn her money.

Figure 5:
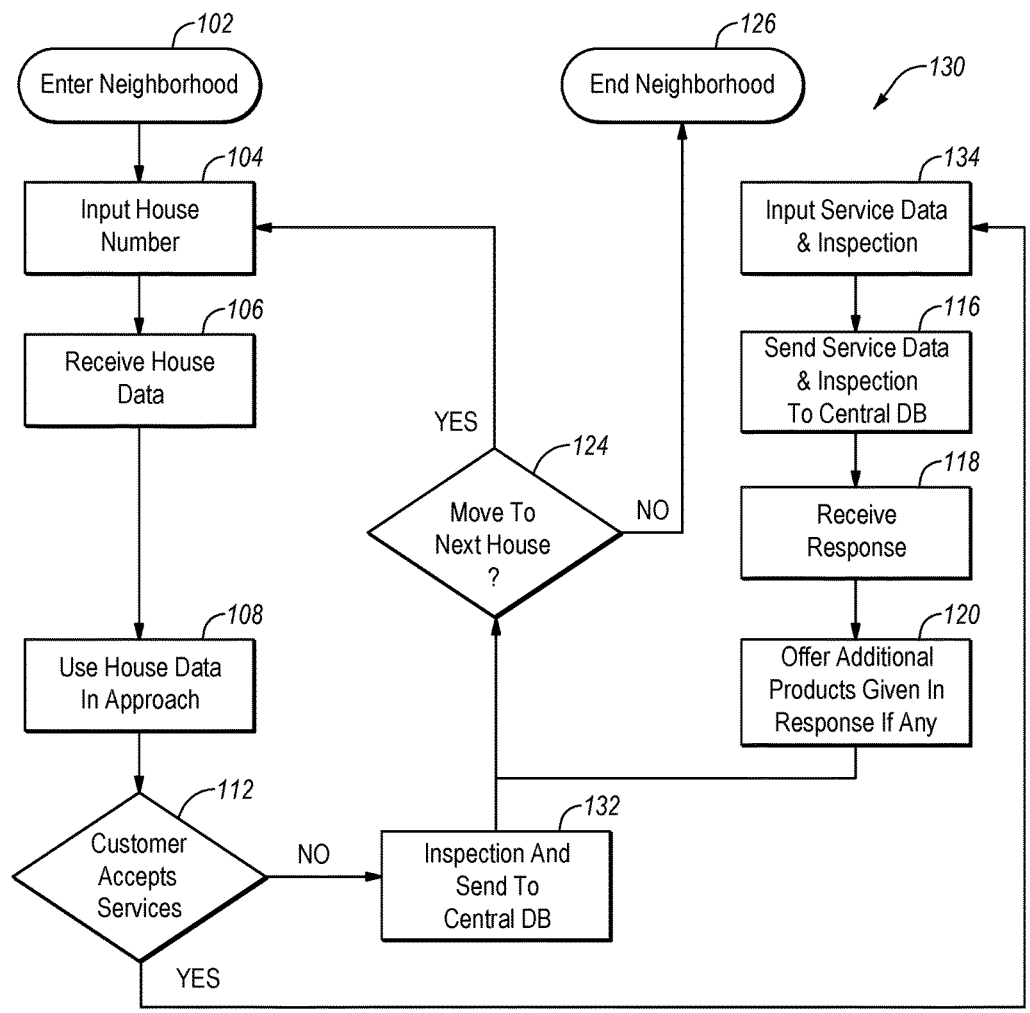
FIG. 5 shows a flowchart of another embodiment of a sales process using a sales management tool.

Turning now to FIG. 5, an alternate embodiment of a sales process 130 is shown. It will be appreciated that some steps may be accomplished in a different order or in parallel. In such embodiments, an inspection may occur after the customer has decided to accept or reject the offered services in 132 or 134.

Figure 6:
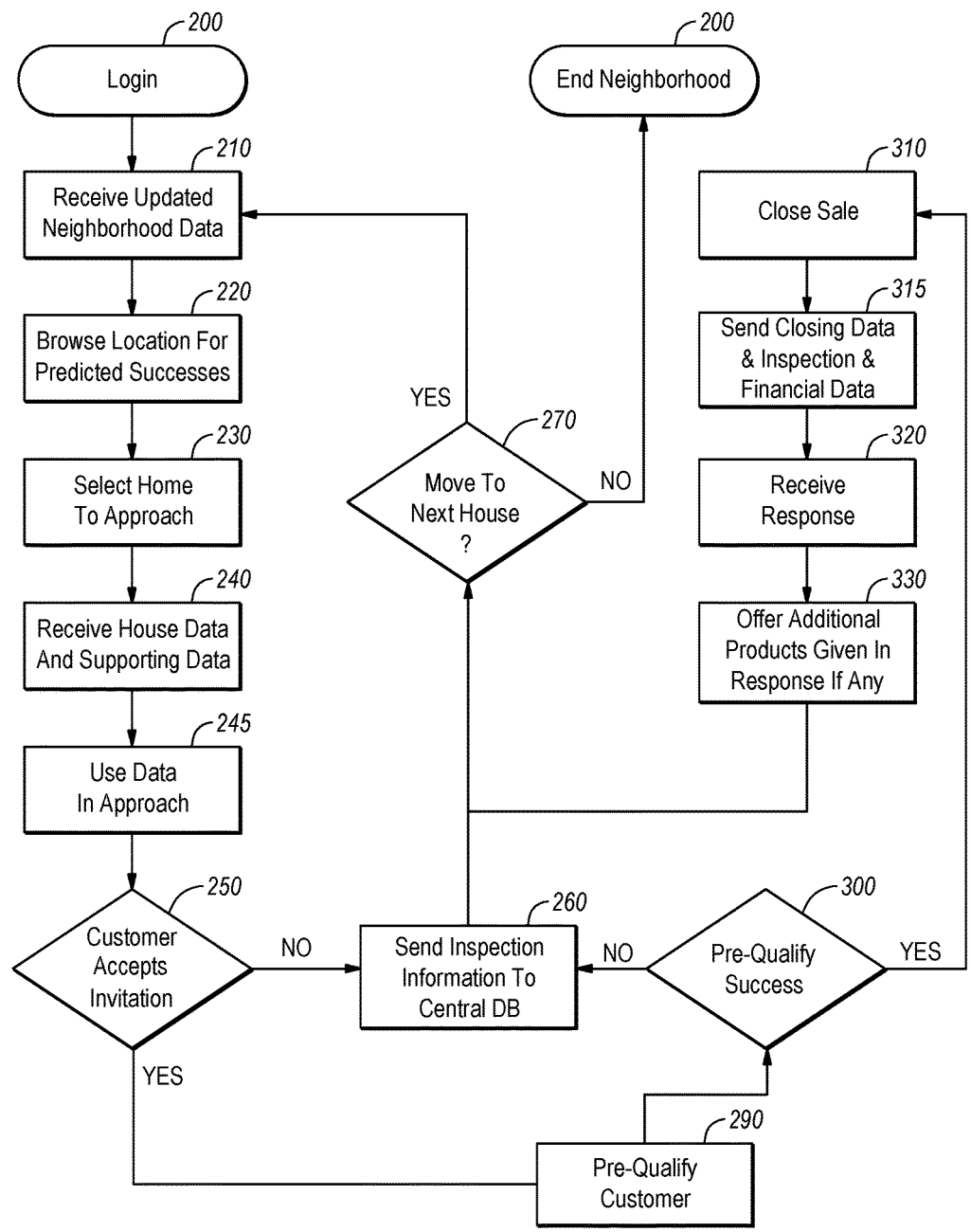
FIG. 6 shows a flowchart of third embodiment of a sales process using a sales management tool.

Turning now to FIG. 6, a flowchart of third embodiment of a sales process using a sales management tool is shown. The user may begin by choosing to login 200. Once logged in, the mobile device may give a current geolocation to the server and receive updated neighborhood data about the surrounding area 210. The user may examine the neighborhood data displayed and look for highlighted predicted successes 220. The user may then tap on the home on the map displayed on the mobile device to select the home for approach 230. A server request may be generated for the information relating to the home selected. The mobile device may receive the house data and supporting data 240 to aid the salesperson in their approach 245. The customer may then indicate a level of interest in the product by whether they accept an invitation 250 to continue with the sales process.

If the customer chooses to not continue with the sales process, the gathered information is sent to a central database 260. This gathered information may include the reasons for rejection (i.e. price is too high, potential customer already owns the product, potential customer does not use the product, etc.), a site survey of the house (including observed products), or other information requested through the mobile device interface. The sales person may then choose to move to a next house 270. If so, the process may begin again at receiving updated neighborhood data 210. If not, the sales person may exit the process 280.

If the customer shows an interest in the sale, the salesperson may use the home data requested earlier to pre-qualify the customer 290. If the pre-qualifying 300 fails, the salesperson may end the sales call and the data may be automatically uploaded by the mobile device in the case of a failure (or it may be manual, with an opportunity to give more information in a site survey) and the inspection information sent to the central database 260.

If the pre-qualification is successful, the sales person may tailor the sale to the customer to close the sale 310 and send relevant data, such as closing data, inspection data and financial data 315. In one embodiment, the system may be used in a security system sales context. The sales person may conduct a site survey and suggest various technologies to install, such as motion detectors, keypads, flood sensors and other useful add-ons. After the customer and sales person agree, the closing may include a deposit put on a credit card. The closing data, inspection and financial data may be sent to the system server for processing. The mobile device may then receive a response 320, such as a confirmation or request for further information if needed. If there are other suggested products or partnerships, the mobile device may present the offers for the salesperson to offer to the customer 330. The salesperson may then decide whether to move to the next house 270.

While many transmissions have been discussed by the use of a mobile device, it should be recognized that the transmissions may be made on or with various channels, mediums and/or protocols. The transmissions may be encrypted, wired or wireless, internet based, satellite based, authenticated, through public or private networks, using TCP/IP, UDP or OS1 or through other methods of communication.

Figure 7:
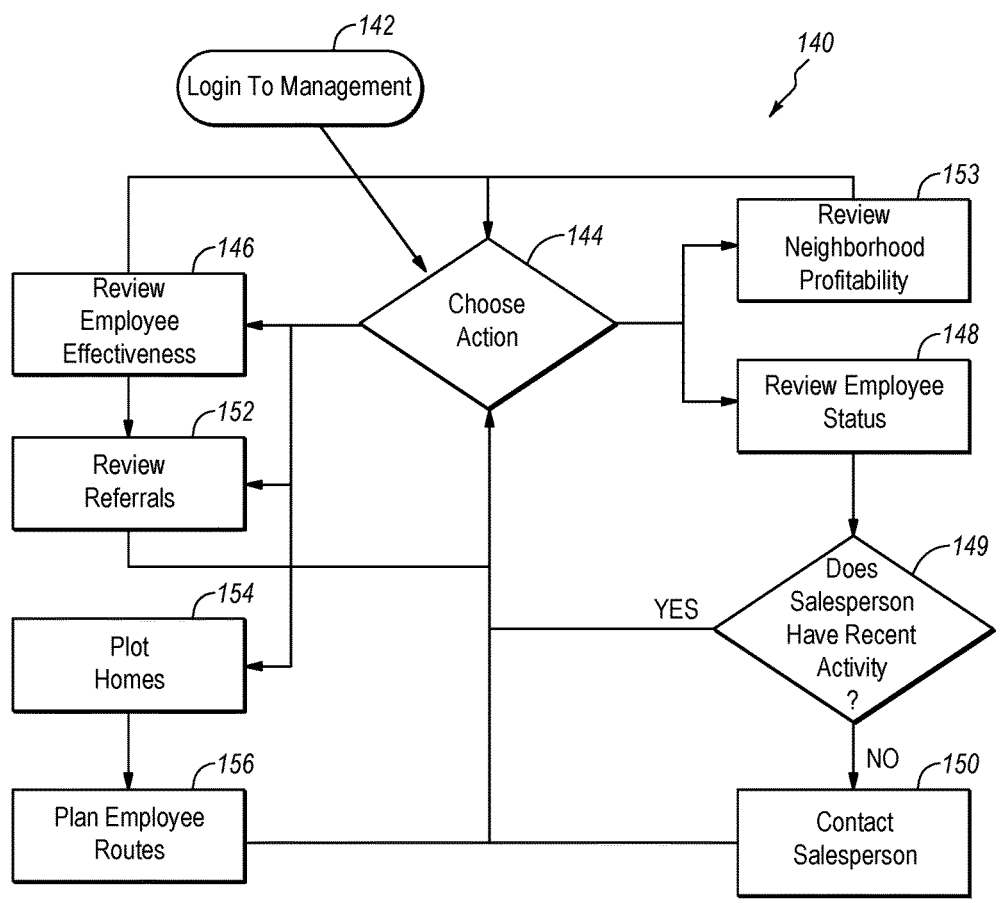
FIG. 7 shows a flowchart of an embodiment of a management subsystem.

Turning now to FIG. 7, a flowchart of an embodiment of the management subsystem 140 is shown. The management subsystem may include portions to manage employees, profitability and resources. The manger may login to the management subsystem 142 and then select a desired action 144. One of the distinct advantages of this system may be that the information within the database has, been field verified by salespeople with an interest in correct information. Subtrends, such as people home/not home, are distinctly more trustworthy from a salesperson marking the data immediately at the home than from a salesperson marking at the end of the street—or worse—at the end of the day, or some longer period.

The management subsystem may include actions to manage employees. In one embodiment, the manager may select to review the employee current employee status 148. As the central service will know the times the salesperson requested house data, the manager may review data that includes the current status of the employee, the number of houses visited, the success rate and even when the last house data was requested. The data may show recent activity 149 or discrepancies signaling a problem, including as a salesperson has not recently requested house data. While in safer neighborhoods, this extended time may be evidence of a salesperson on an extended break, in more dangerous neighborhoods it may alert the sales manager to a potentially dangerous situation. Therefore the sales manager may contact the salesperson 150 and resolve any problems encountered.

In one embodiment, the manager may select an employee effectiveness report 146. The report may use field verified data from the central service to give a more accurate picture of performance than profitability alone. For instance, if a salesperson's results status is showing many residents that were home but did not accept the services or product offering, sales training and help may be in order. However, if a salesperson was sent to a neighborhood with few people home, the salesperson may simply need a better territory. Similarly, more granular results may be useful as well. If the salesperson shows a lot of people home and a significant time between retrieving the house data and sending the failed sales result and inspection data, the salesperson may need training in closing the sales deal—as the sales person's approach is likely ineffective.

The profitability of the territory, neighborhood and sales people may be reviewed. In one embodiment, the manager selects to review neighborhood profitability. Significant sales within a neighborhood as evidenced against the number of people home may suggest a profitable trend to exploit. For instance, recent events, such as burglaries or other crimes within a neighborhood may cause more people to willing to purchase a security system or insurance. However, if the neighborhood contains many working couples, that trend may go unnoticed. Therefore field verified data may be very useful to spot these trends. Normal sales data with sales per neighborhood may miss such a valuable insight available with field verified data.

One of the valuable insights may come from the manager selecting to review the referrals 152. In one embodiment, the manager can review the referrals generated and their profitability. The manager may then inform the sales people of the opportunity presented by the verified data and the corresponding returns. As the sales people are likely to make more money with the sales opportunity, the sales force may be happier as well.

In another embodiment, the manager may manage the data stored in the referral database. The manager may collect a list of residents that have a specific need based on the verified data. Once the data reaches a critical mass, it may be sold or given to a partner in exchange for value.

Another valuable insight that comes with the field verified data is that a plot of unvisited homes 154 may be very accurate. Further, the field verified data may include attempted times and dates of sales visits. With this data, the system may create an estimate of the number of people home at a selected time on a selected day. The model may also include a recency factor, to revisit homes after a certain delay. Homes may also be included that requested that a salesperson visit another time, or after a delay, which may be frequently overlooked with paper data tracking methods.

By leveraging this data, the software in conjunction with the manager may plot neighborhood routes 156. Using the verified data, these routes may be adjusted based on predicted profitability, number of houses to visit, estimated difficulty of sale or other metric that may be derived from the verified data and other data available.

Many of the actions and reports may also be configured to give live updates to the sales manager or other person with a need for the information. Such immediate information may be communicated in email, text messages or other forms of communication. In one embodiment, a text message will be generated if the employee does not request house data within a certain period of time. This also may be adjusted according to the last request received by the central service. A salesperson that has finished an inspection, but has not request new house data, may have a shorter timeout than a salesperson who has requested the house data and is likely in a sales situation.

While a more generic embodiment is shown in FIG. 7, it should be realized that there may be several layers to the management subsystem. In another embodiment, the management subsystem may be split into a sales manager management subsystem, a referral management subsystem and an overall management subsystem. The sales manager subsystem may give report and route information to the sales manager for her area, but restrict the sales manager from partner and profitability statistics. The referral management subsystem may restrict the referral manager from route and salesperson information, but give access to partner data and statistics. The overall management system may give all access, but also include reports about each individual sales manager and assess profitability of each of the partnerships and/or offers.

Figure 8:
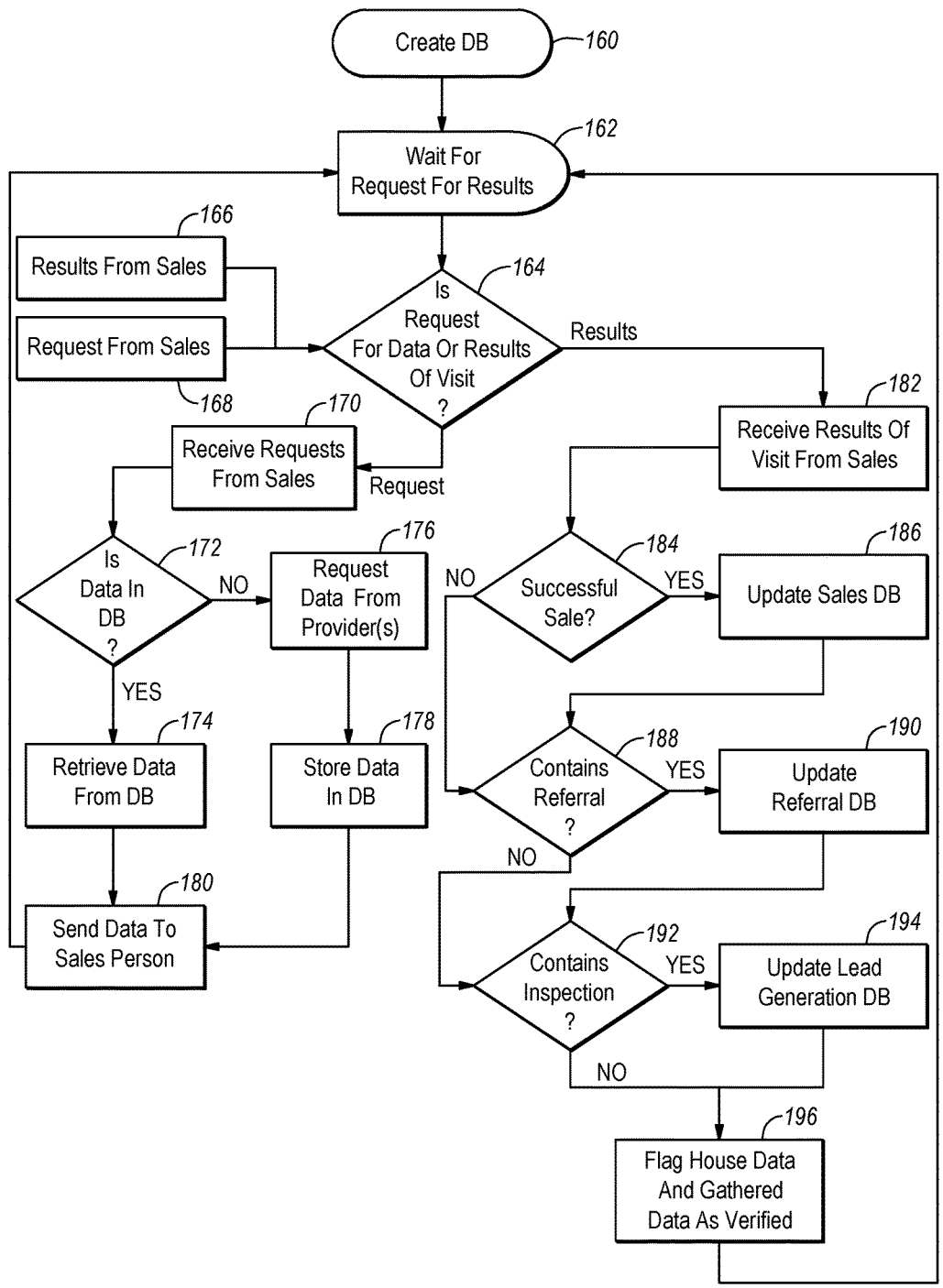
FIG. 8 shows a flowchart of a database enrichment subsystem.

Turning now to FIG. 8, a flowchart of the database enrichment subsystem is shown. In one embodiment, the system has at least two purposes: to deliver data to sales people for better sales approaches and to enrich the database with field verified data. As any data retrieved is likely to be enriched by a response, the more the database is used, the more valuable it becomes.

In one embodiment, the process begins with the database (s) being created 160. After creation, the system may wait for requests or results from sales people 162. When a message is received in 164, the message must be identified as results from sales 166 or a request from sales 168. Once identified, the system may begin to process the message appropriately.

In the case of a request from sales 168, the sales person would like to query the database about a residence. The system may receive the request from sales 170, parse the message and store appropriate data. If the requested data is in the database 172, the system may simply retrieve the data from the database 174. If not, then the system may request the data from an external provider 176 or even multiple providers. This new data is then stored in the database 178. After the data is retrieved by either method, the data is sent to the salesperson 180 and the system waits for another request 162.

In the case of results from sales 166, the salesperson may be returning data related to the house data requested earlier. The system may receive the results from sales 182, parse the message and store appropriate data. In one embodiment, this includes if there was a successful sale 184, updating the sales database 186 with that information. Then if the message contains a referral 188, updating the referral database 190. And if the message contains an inspection 192, then updating the lead generation database 194. Finally, any field data gathered is flagged as verified 196.

Data about the request or results message may be stored as well. In one embodiment, the time difference between the request for information about a house and the results may correlate with the effectiveness of a salesperson. Similarly, storing times and dates of residents found at home may correlate with the best times to visit the neighborhood. Thus, effective field verified data may include more than just sales and referrals.

While some events in the description of figures may seem to be sequential or tailored to a single request, it should be recognized that both the processing of a request step and the processing of multiple requests may be done in parallel. For instance in FIG. 8, data may be simultaneously requested from an external provider in 176, while results from the database may be retrieved in 174. The results may be compared and differences flagged.

In FIGS. 9 to 32, an exemplary embodiment is shown through the use of screenshots and a description of the process. It should be recognized that the process may implemented in other ways and not limited to the embodiment described. For instance, the specific embodiment of the mobile device shown is an iPhone by Apple with an application called DataReef.

Figure 9:
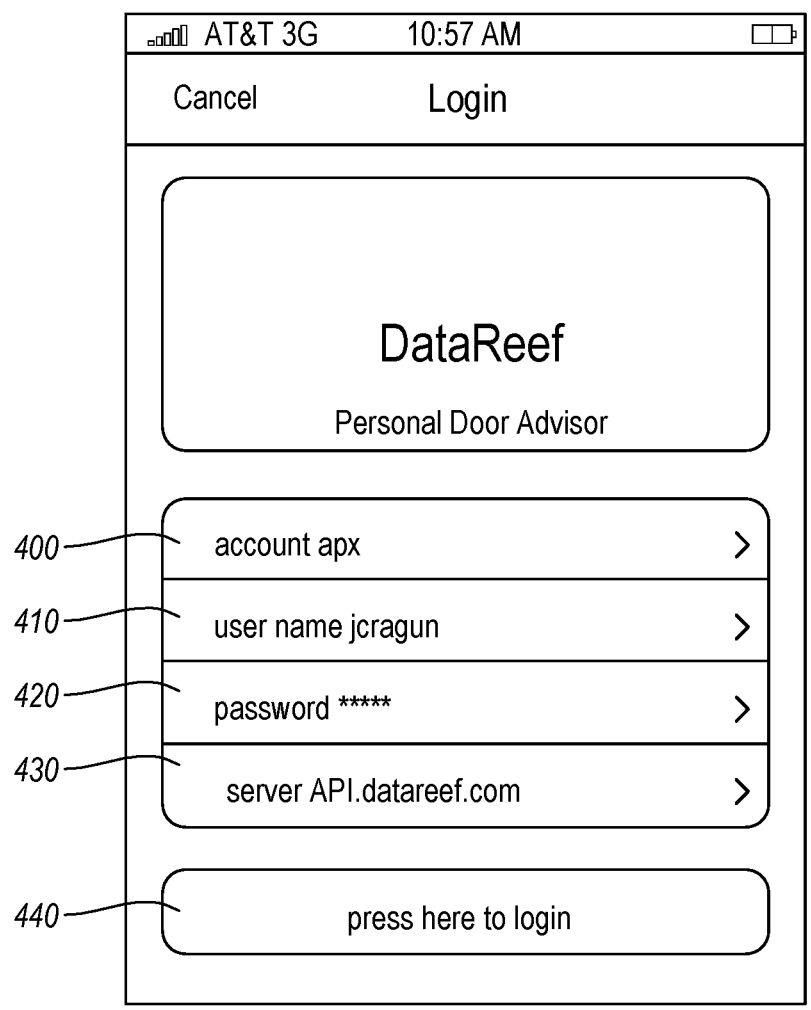
FIG. 9 shows a screenshot of a login screen of a sales management tool.

Upon arriving in a neighborhood, a user may activate the system on their mobile device. In FIG. 9, the user activates the application and logs in. More specifically, the user may enter the account owner 400, user name 410, password 420 and server name 430 to log in 440.

Figure 10:
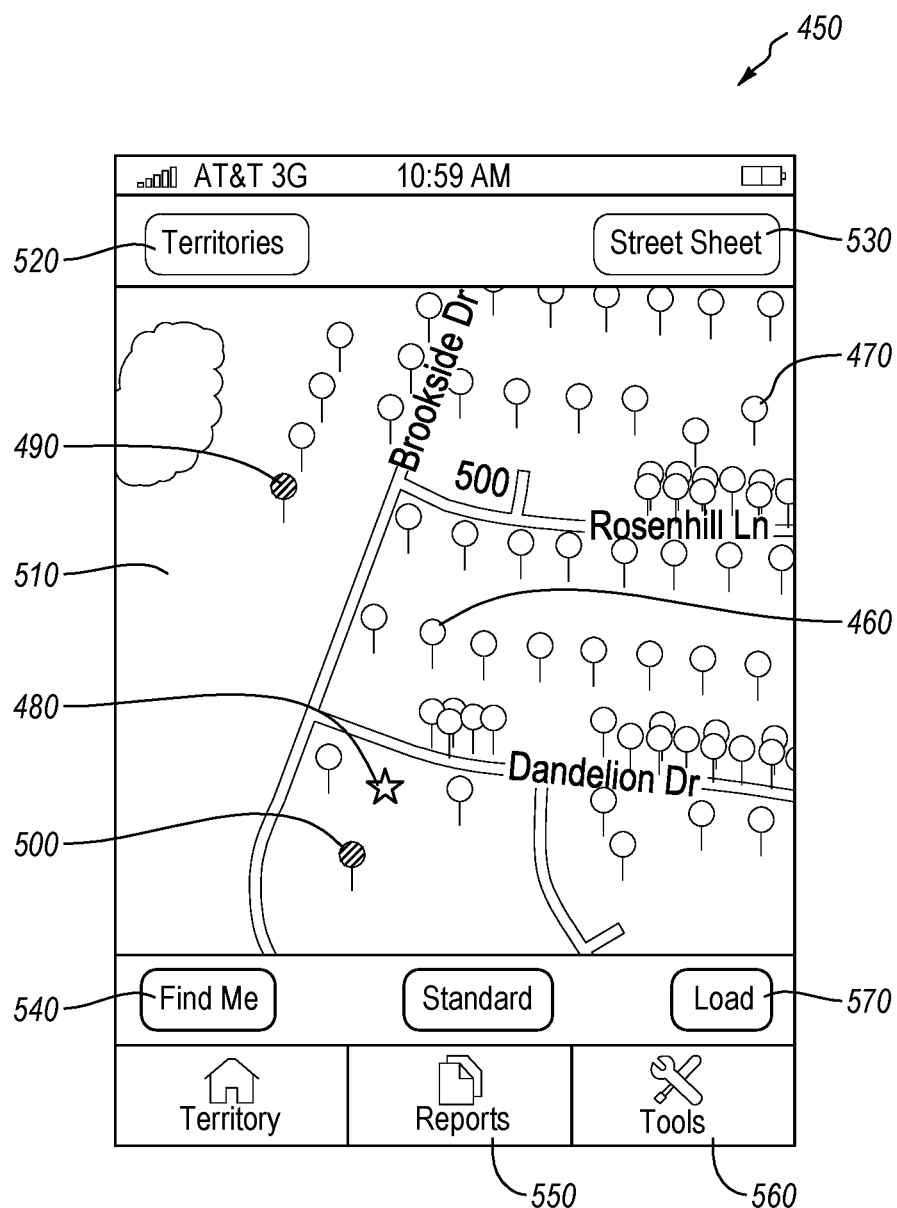
FIG. 10 shows a screenshot of a map screen of a sales management tool.

Once successfully logged in, the user may be presented with neighborhood screen 450 as shown in FIG. 10. Using a location device, such as GPS, the mobile device may identify and display the current location 460 of the sales person on a map. The map may also identify individual homes, such as by a push-pin 470. Homes with special relevance may be highlighted. Here, the homes identified by the sales engine through predictive analysis as high potential are highlighted with a star 480. Prior sales are identified by a green highlight 490. Homes registered by a prior sales call as "not interested" are highlighted red 500. Prior sales calls that registered the home as "not home" may be gray 510. Other potential information may also be highlighted, such as current accounts, potential danger, or other information, including those related to safety, profitability, past history or difficulty of sale. The salesperson may also choose to access other portions of the tool, such as a territories report 520, the street sheet layout 530, refocus on the current location 540, switch to reporting 550, select other options 560 or request a refresh of the current information 570.

Figure 11:
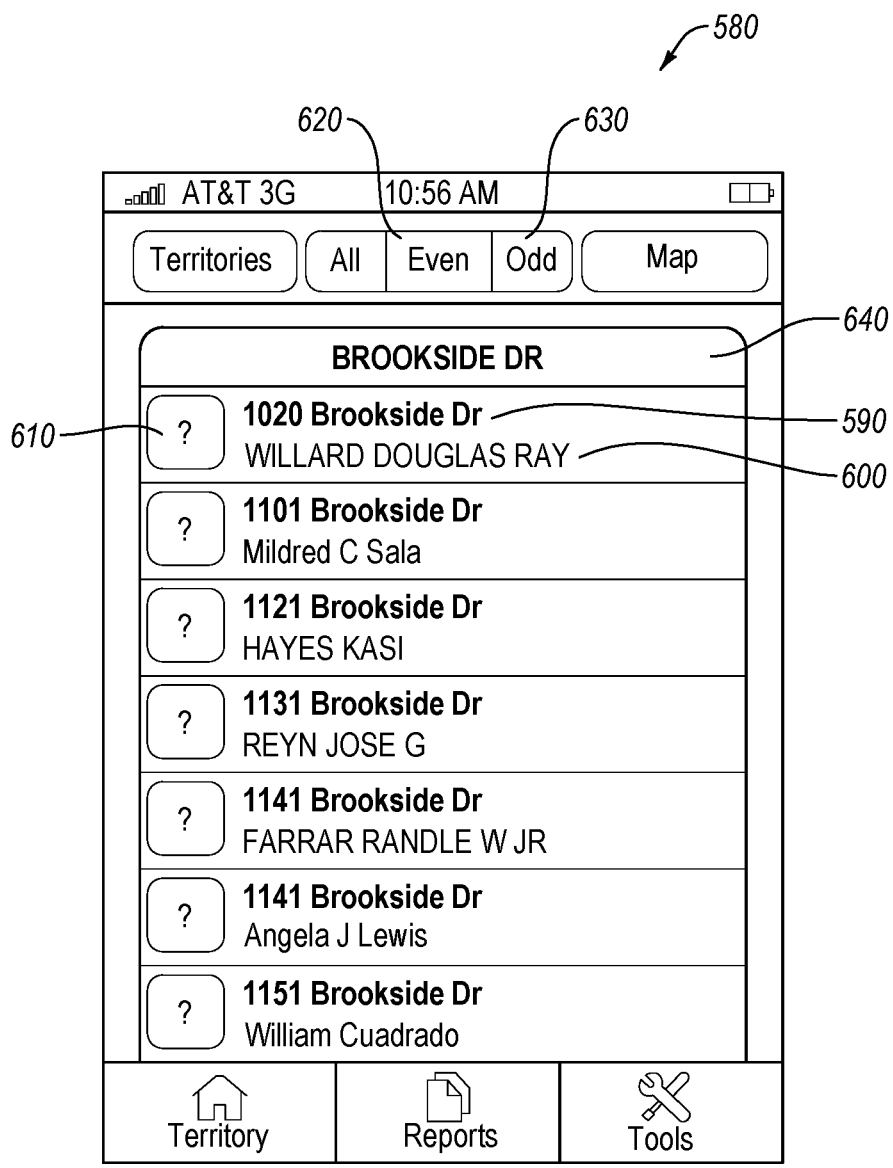
FIG. 11 shows a screenshot of a street sheet screen of a sales management tool.

If the salesperson desires, the salesperson may choose to view the list of homes on a street sheet 580, such as in FIG. 11. The street sheet may include house addresses 590 associated with homeowner names 600 retrieved from public or private databases. Each home database entry may be further enriched with data from the sales system, such as an icon 610 indicating the last status of contact. In the current screenshot, there was no last status of contact for the homes listed. The street sheet may include further features for ease of use. A salesperson may limit the listings to even 620 or odd 630 house numbers, because the sales person may only want to walk on one side of the street. The home listings may also be grouped by street 640. The tool may also provide methods to link to other portions of the tool as more fully described above.

In some embodiments, the sales person is only allowed to view the homes within their assigned territory. Thus, homes not within the sales person's territory may be hidden from view, including the street sheet and the map view. A sales manager may control this feature from their sales management interface.

Figure 12:
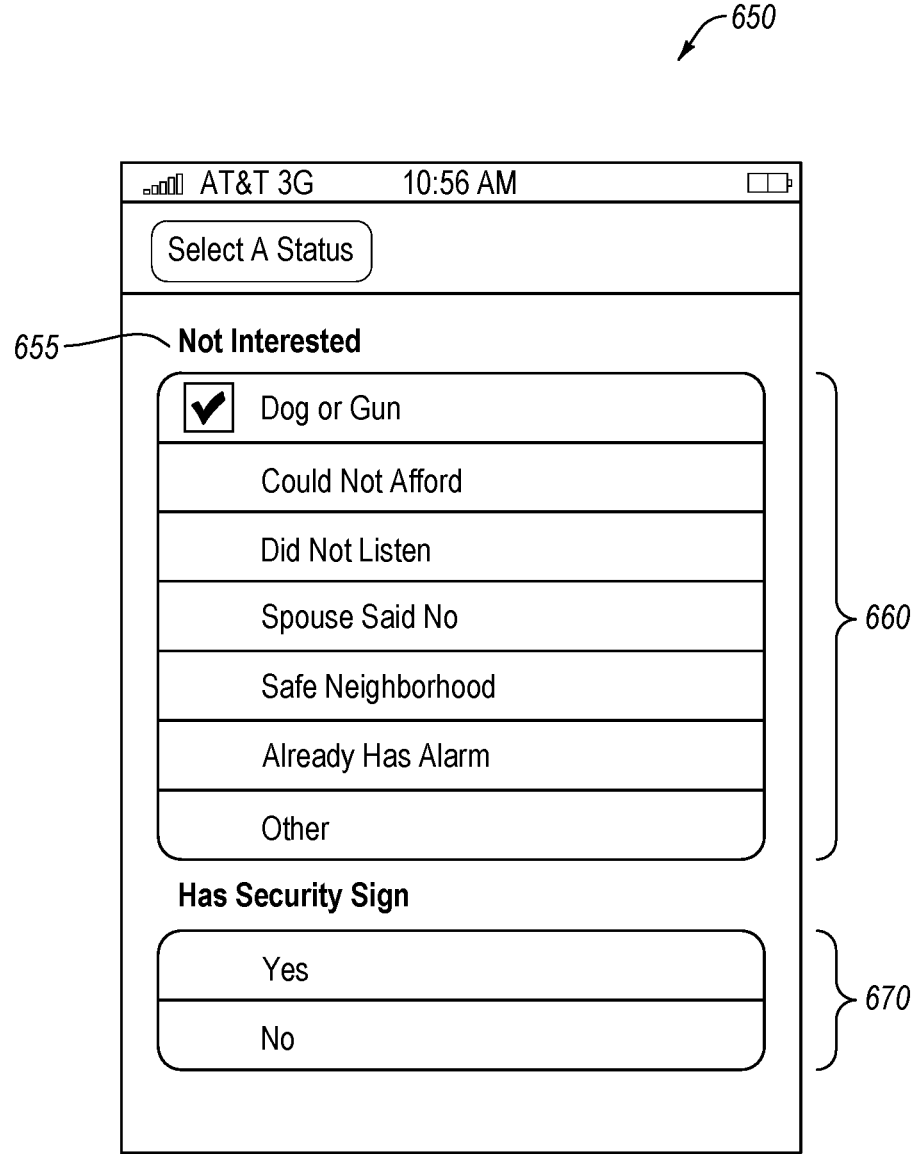
FIG. 12 shows a screenshot of a rejection screen of a sales management tool.

If the sales person approaches a home and the sales call results in a person not interested, the salesperson may mark the home as not interested along with a reason code. FIG. 12 shows a screenshot of an outcome coding screen 650 that shows the current outcome 655 and includes a reason code 660 and a relevant survey 670. In this case, the salesperson is surveyed on whether the home displays a security sign.

Figure 13:
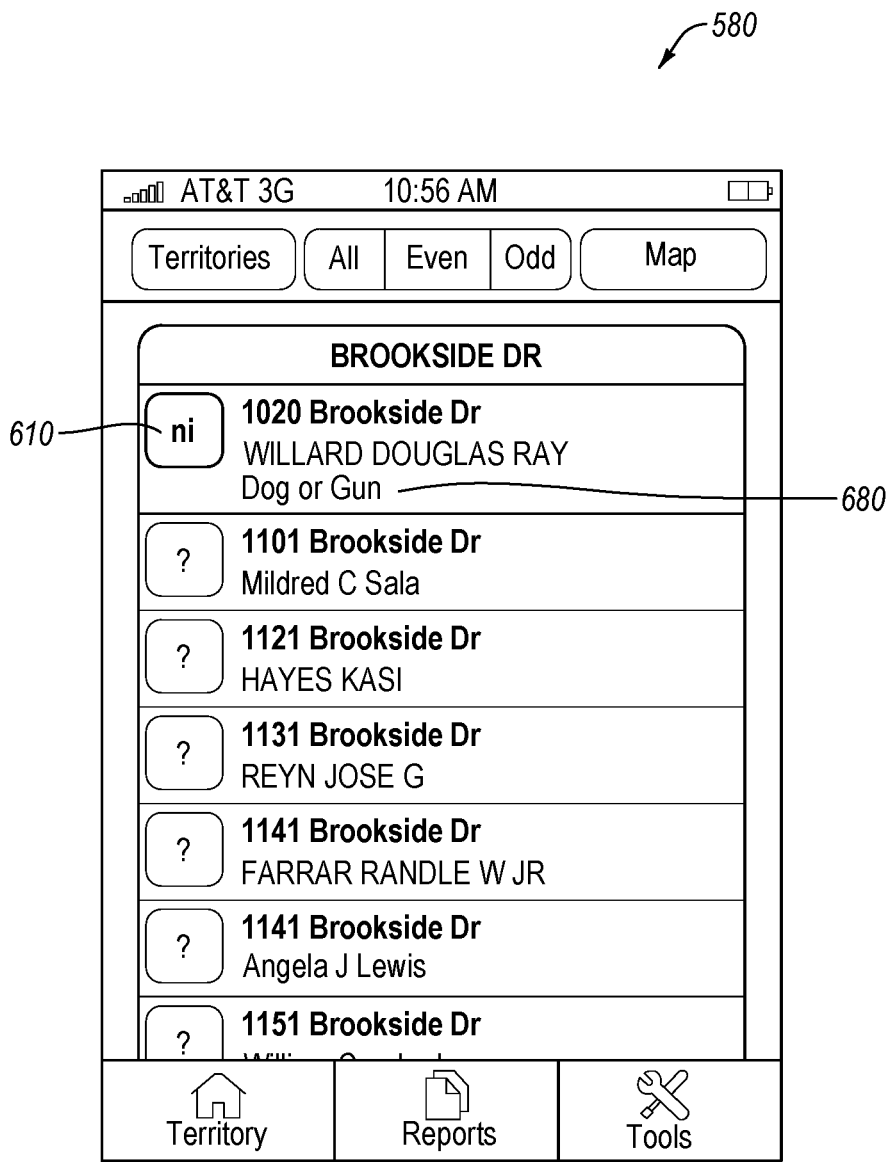
FIG. 13 shows a screenshot of a street sheet screen with a contact result of a sales management tool.

The system may then return to the neighborhood listings, such as the street sheet shown in FIG. 13. The home status icon 610 may be updated to display the current states of the neighborhood homes. Here, the top address was updated to not interested with a reason 680 of the fact the owner had a dog or gun.

Figure 14:
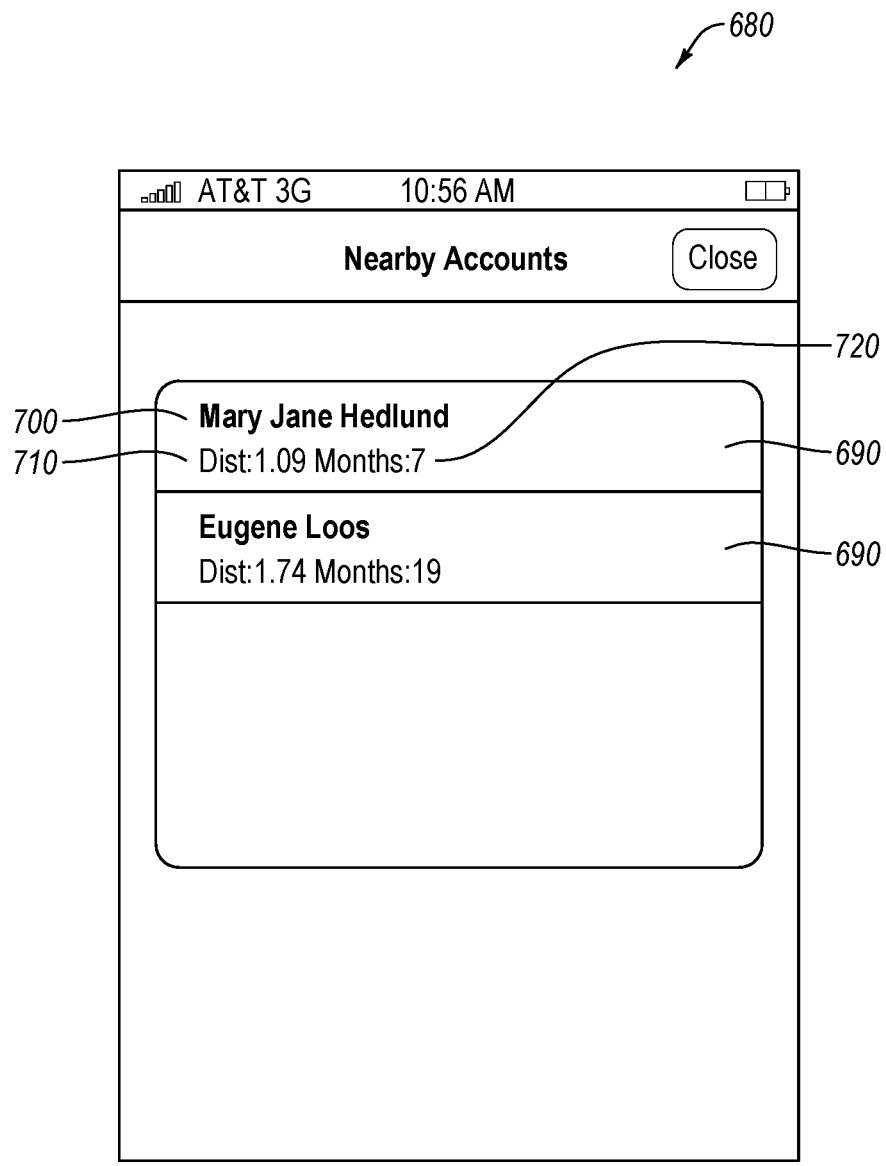
FIG. 14 shows a screenshot of a nearby accounts screen of a sales management tool.
Figure 15:
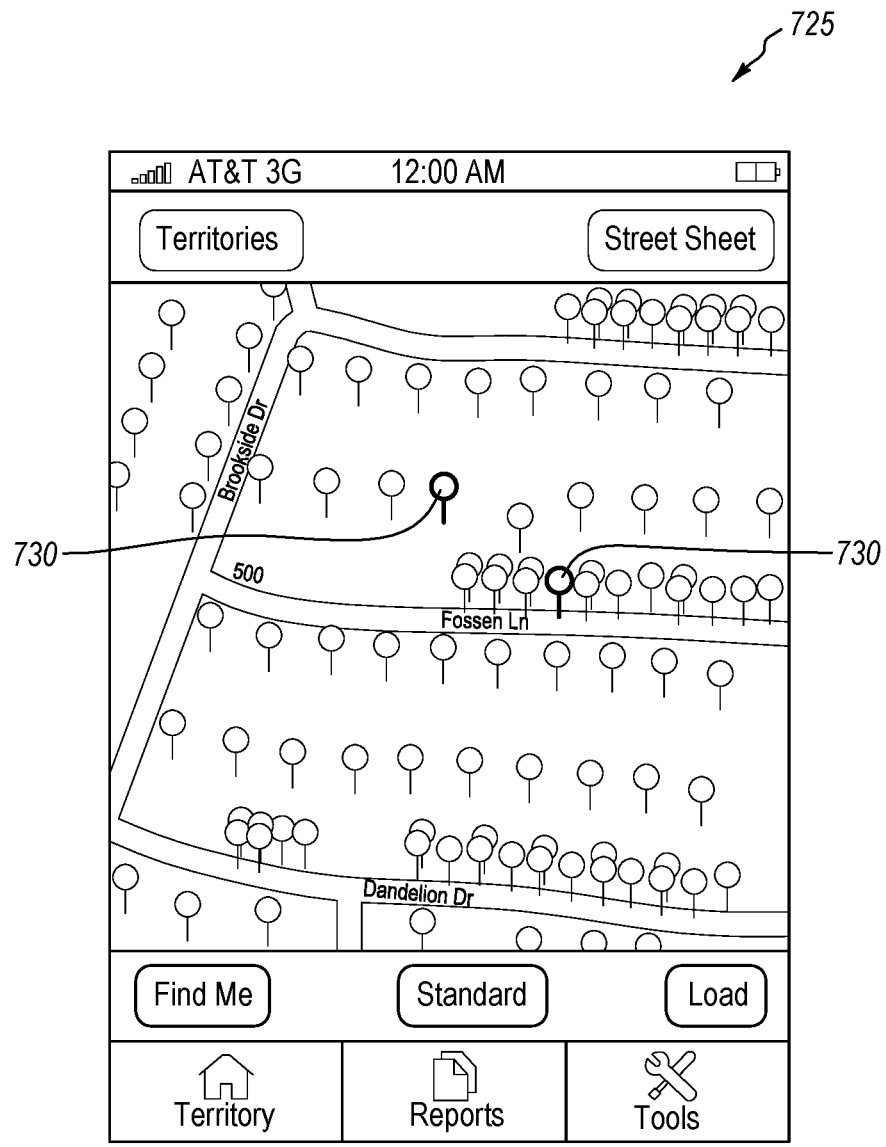
FIG. 15 shows a screenshot of a nearby accounts map screen of a sales management

However, if the sales call approach is not immediately dismissed, the salesperson may request useful supporting information. In FIG. 14, the salesperson may retrieve nearby current accounts 690 as references as a current accounts list screen 680. In the event that a sales person represents a company who has existing or former customers in the near vicinity of where the sales person is currently working, it may be helpful to the sales person to know information about the nearby accounts, such as names 700, distance 710 and number of months 720 as a customer. The sales person may use their names for reference and creditability. If needed, the accounts may also be listed on a map screen 725 to gauge the proximity to the current sales opportunity, such as highlighted account pins 730 in FIG. 15.

Figure 16:
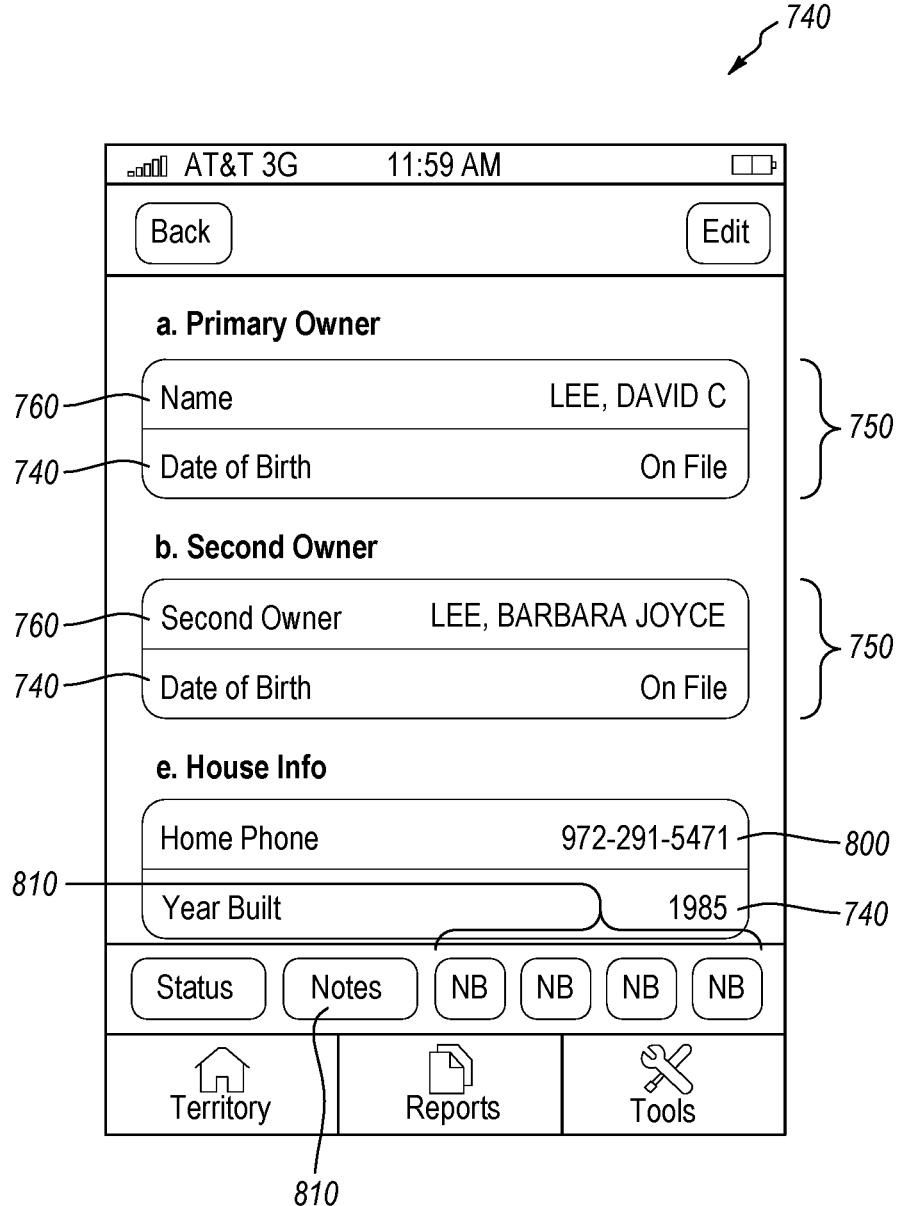
FIG. 16 shows a screenshot of a home information screen of a sales management tool.
Figure 17:
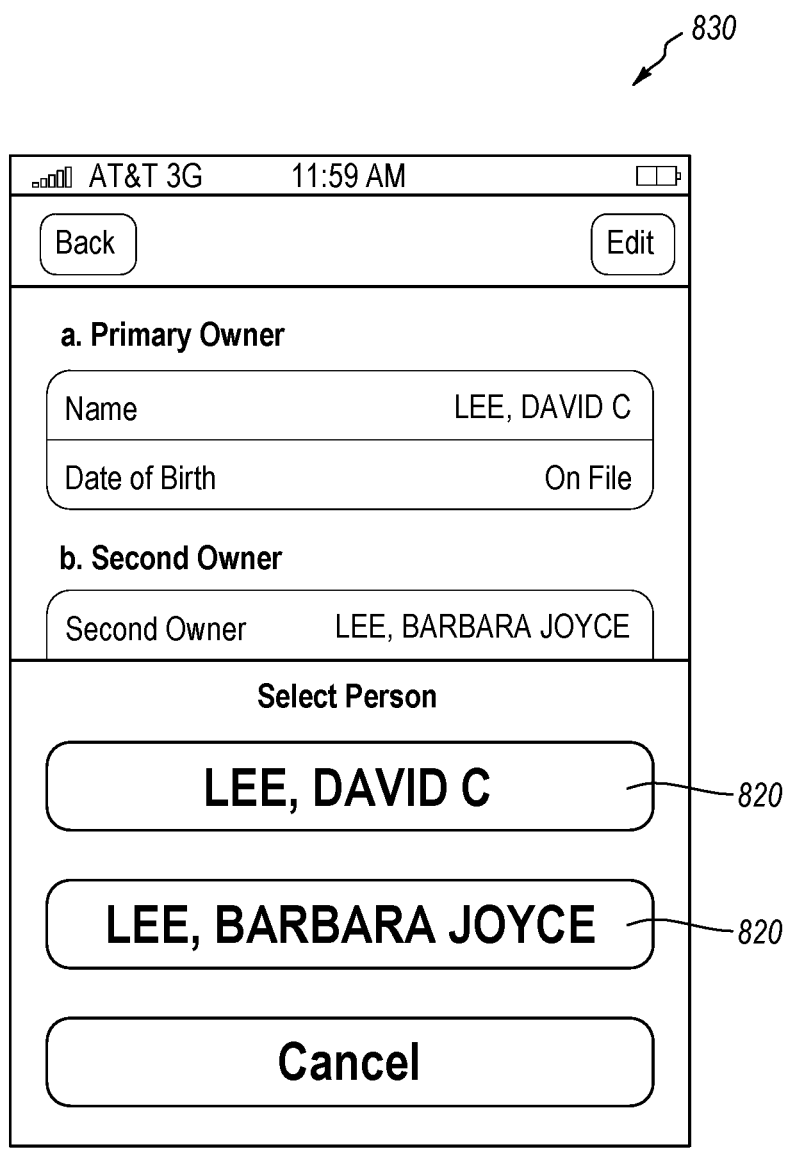
FIG. 17 shows a screenshot of a homeowner selection screen of a sales management tool.
Figure 18:
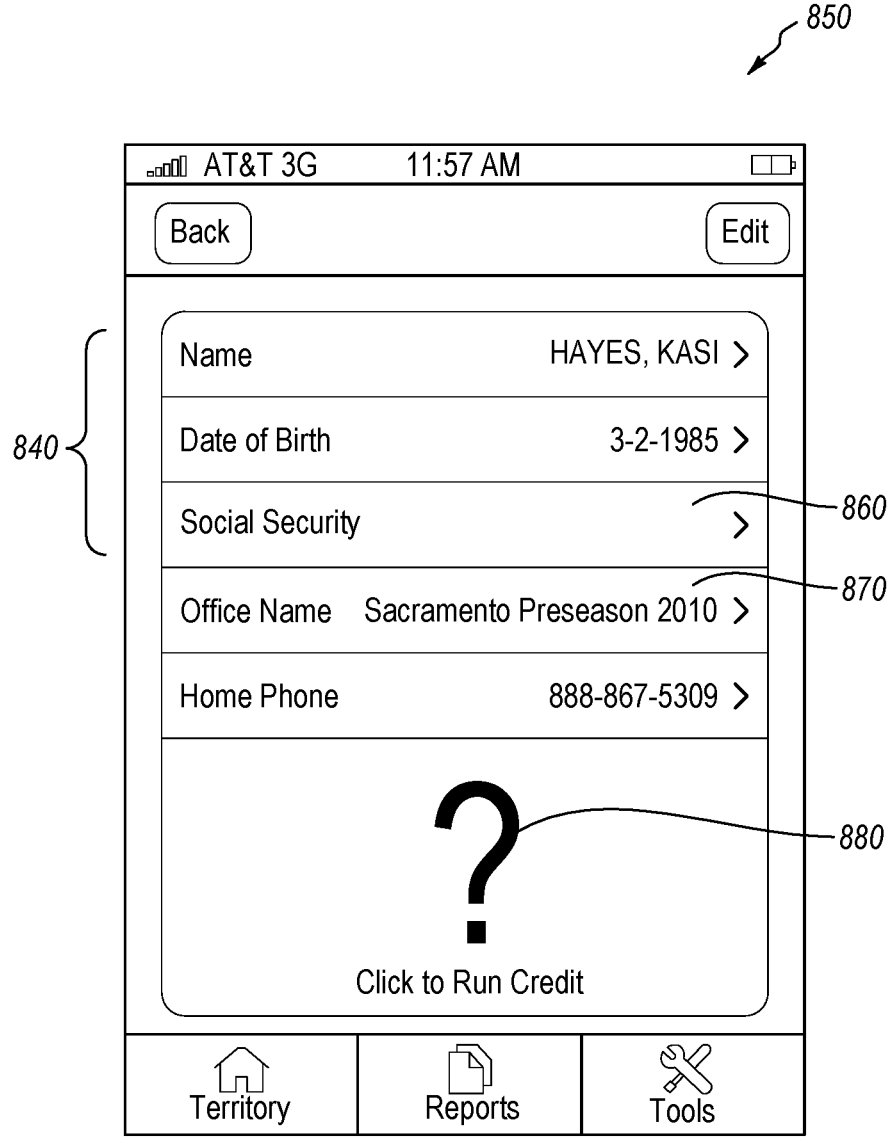
FIG. 18 shows a screenshot of a credit pre-qualification screen of a sales management tool.

If needed, the salesperson may call up an information screen 740 on the expected residents of the home, such as in FIG. 16. This screen may be gathered from a mix of public and private databases. For instance, the home address information may be used to identify the residents 750, and then the residents names 760 may be used to look up information about them personally 780. This information may also include information that helps the sales person close the sale. In some cases, the important information may be highlighted, such as reports of recent crimes in the area or that house specifically. In other cases, the information may be present, such as the build date of the house 790 or expected phone number 800. If needed, the Salesperson may take notes or request further reports 810. These reports 810 may require an extra request because the report costs money.

For example, if the salesperson decides that the current sales opportunity is promising, the salesperson may request a pre-qualification of at least one of the residents. Using the information retrieved previously about the expected residents, the salesperson may select a resident 820 from the resident selection screen 830 shown in FIG. 17 and automatically include the currently known information 840 into the pre-qualification screen 850 shown in FIG. 18. If changes are required, the salesperson may select individual items to correct. Sensitive information may be hidden or restricted from the sales people, including social security numbers 860. However, in the event of a request failure, the salesperson may be permitted to enter new information, without access to the original information. Similarly, cost attribution information 870 or other accounting information may be entered. Otherwise, the salesperson may select the pre-qualification button 880 to run the pre-qualification.

Figure 19:
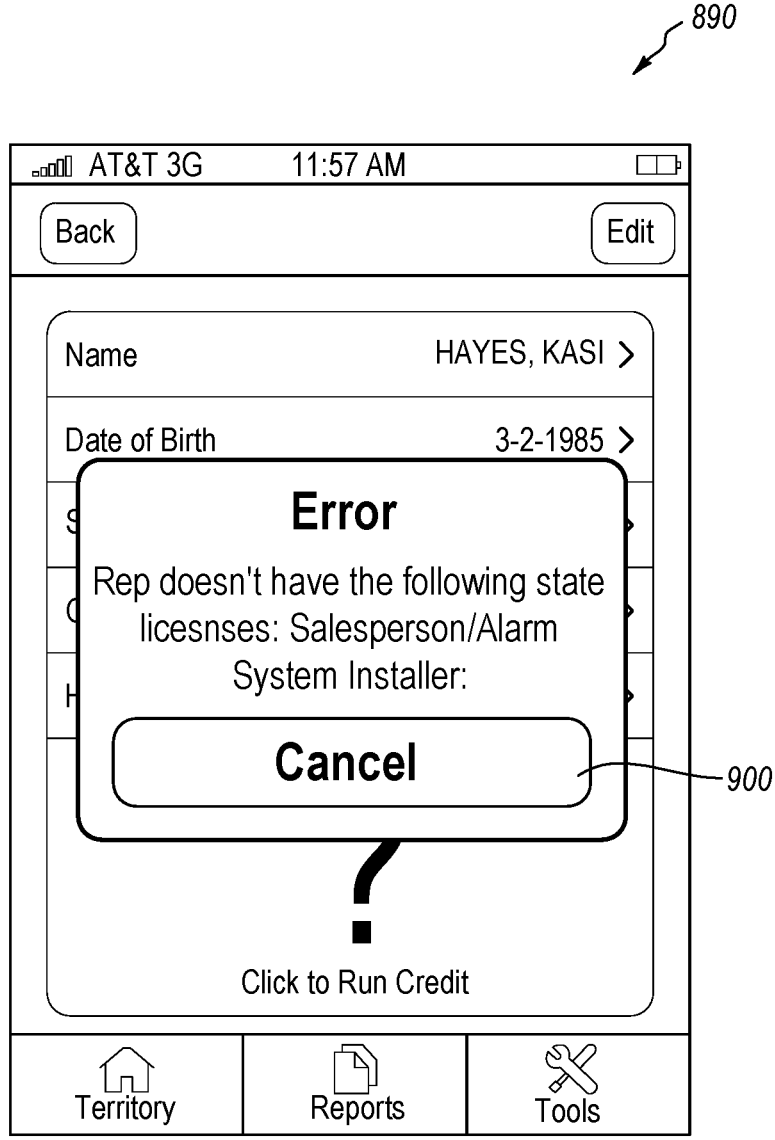
FIG. 19 shows a screenshot of a validation screen of a sales management tool.

The system may include checks and verifications to enforce compliance with policy or law. In some cases, it may be useful to restrict a salesperson from closing a sale. In some cases it is useful to restrict salespeople who are not licensed in the state from completing a sale. In FIG. 19, the compliance screen 890 is a method to restrict the pre-qualification ability to people with state licenses. A pop-up 900 is shown with an explanation relating to the noncompliance reason. In this case, if the pre-qualification screen cannot be run, the sale cannot be completed. The unlicensed salesperson would have to request a licensed person to complete the sale.

Figure 20:
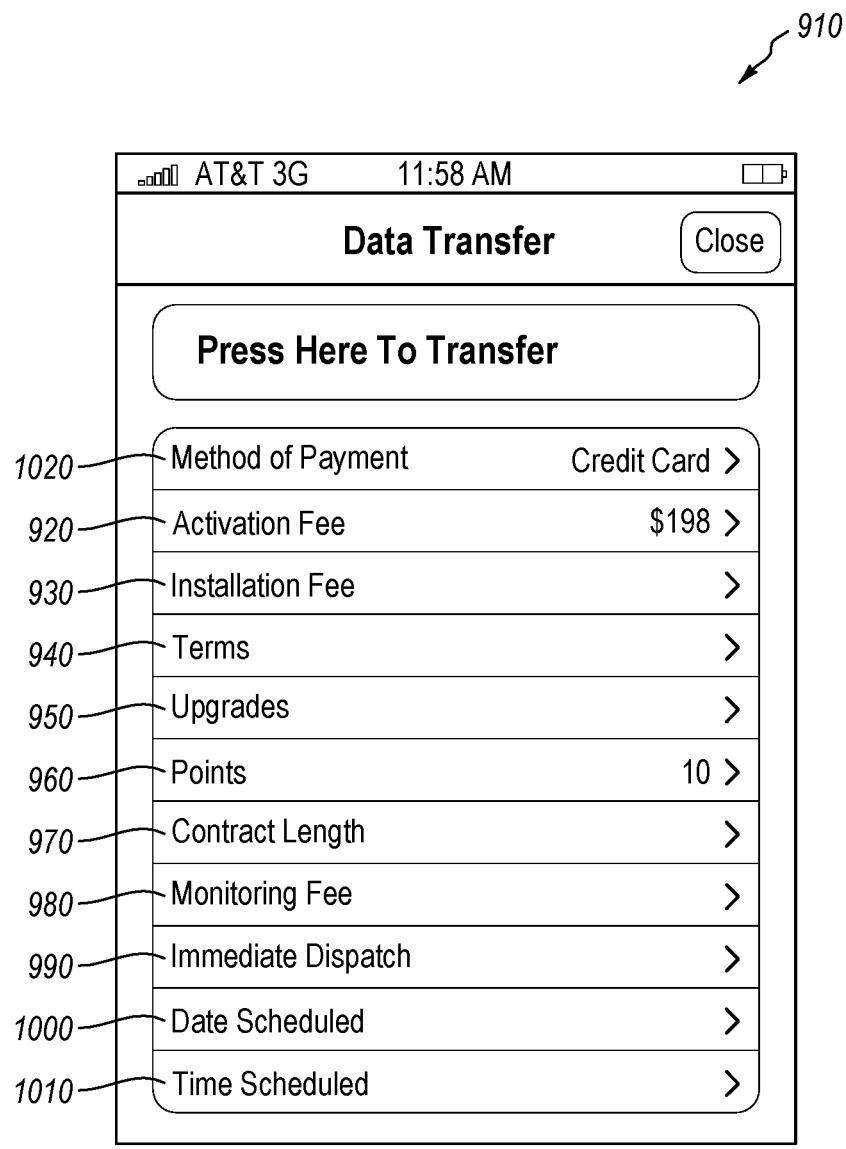
FIG. 20 shows a screenshot of a deal closing screen of a sales management tool.

Once the resident has passed pre-qualification, the salesperson may work out the terms of the sale, such as seen in the terms of sale screen 910 in FIG. 20. This may include activation fees 920, installation fees 930, terms 940, upgrades 950, points 960, contract length 970, monitoring fees 980, immediate dispatch 990, installation date scheduling 1000, installation time scheduling 1010 or other important data. Once complete, the salesperson may also arrange to take payment 1020 for any deposit or fees owing, by inputting the information in the mobile device. In some cases, the payment may be immediately processed.

Figure 21:
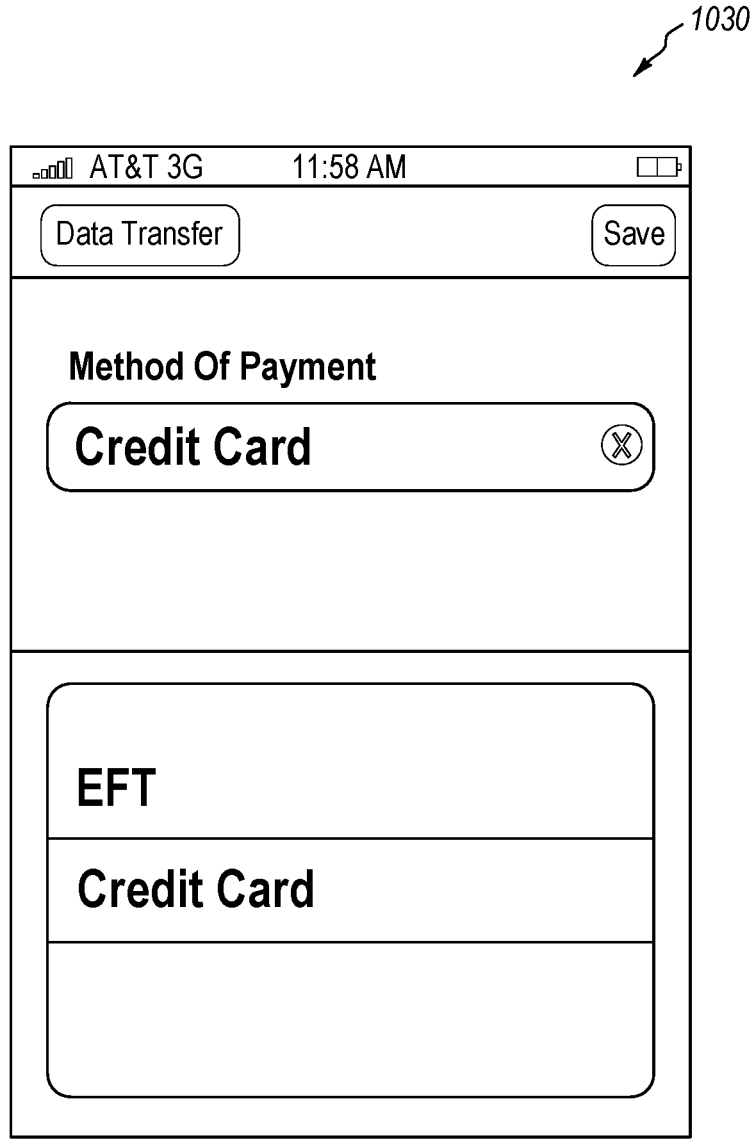
FIG. 21 shows a screenshot of a payment selection screen of a sales management tool.
Figure 22:
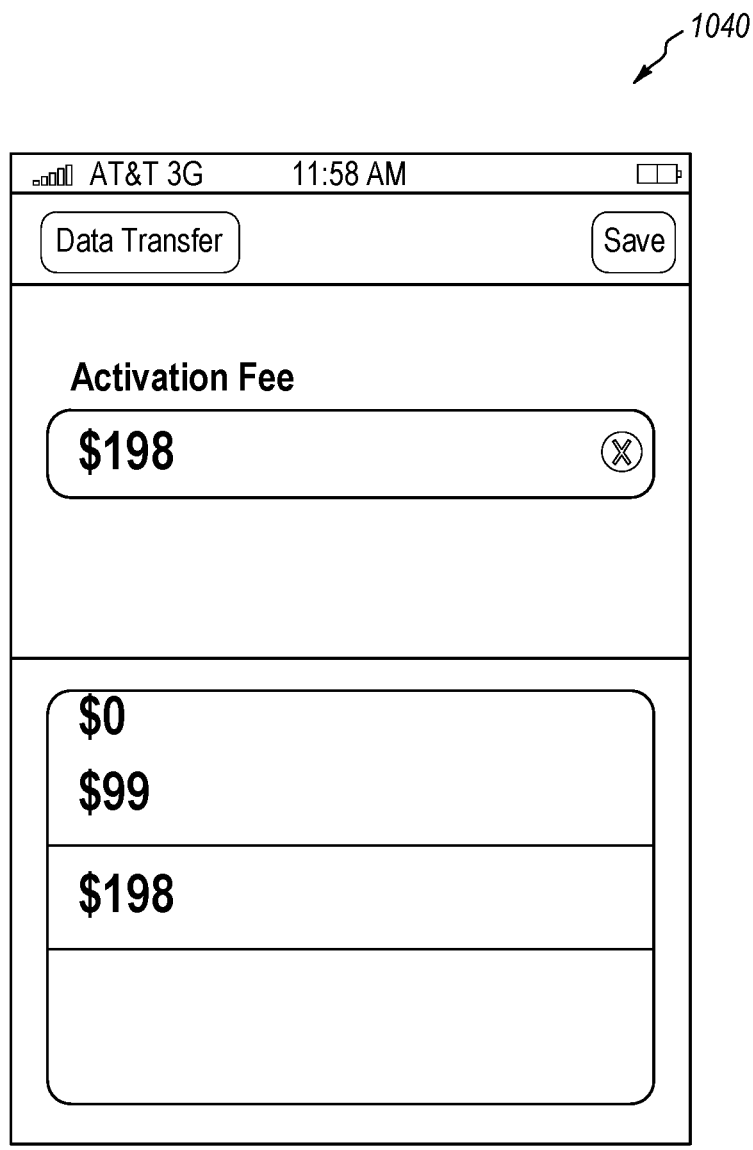
FIG. 22 shows a screenshot of a activation fee selection screen of a sales management tool.
Figure 23:
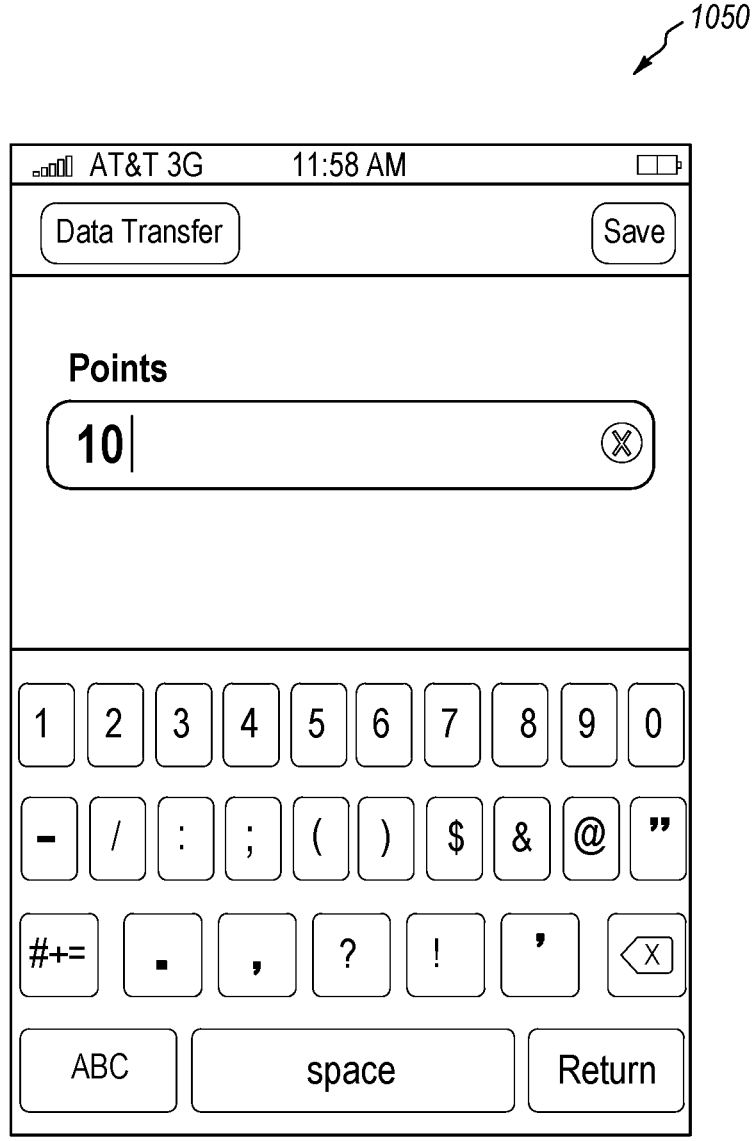
FIG. 23 shows a screenshot of a points selection screen of a sales management tool.
Figure 24:
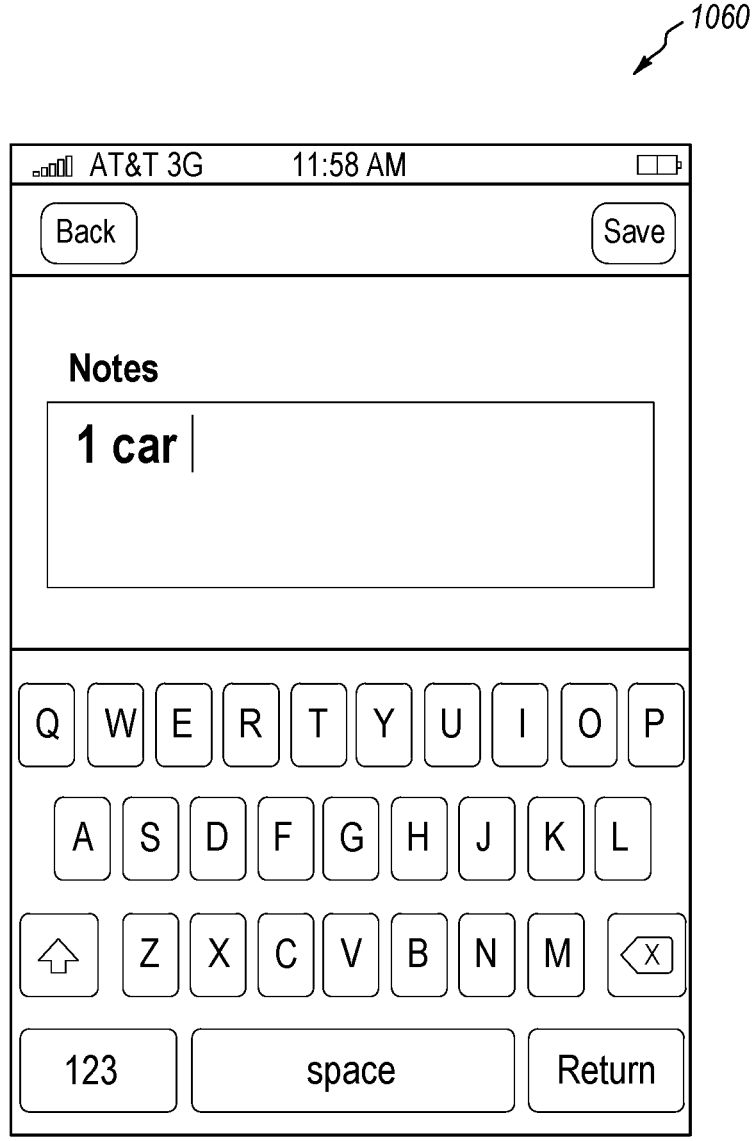
FIG. 24 shows a screenshot of a notes screen of a sales management tool.

FIGS. 21 to 24 show different methods of imputing and restricting input to the terms of sale. For example, the payment screen 1030 payment types may be restricted to specific cards, credit cards or EFT, as shown in FIG. 21. Similarly, the activation fee screen 1040 may be restricted to authorized activation fee levels, as shown in FIG. 22. However, a more generic input may be desired for other input, such as in the points screen 1050 for points, in the case of alarm installation sales, as shown in FIG. 23. Similarly, FIG. 24, shows a notes screen 1060 with generic input for notes on the sales opportunity.

Figure 25:
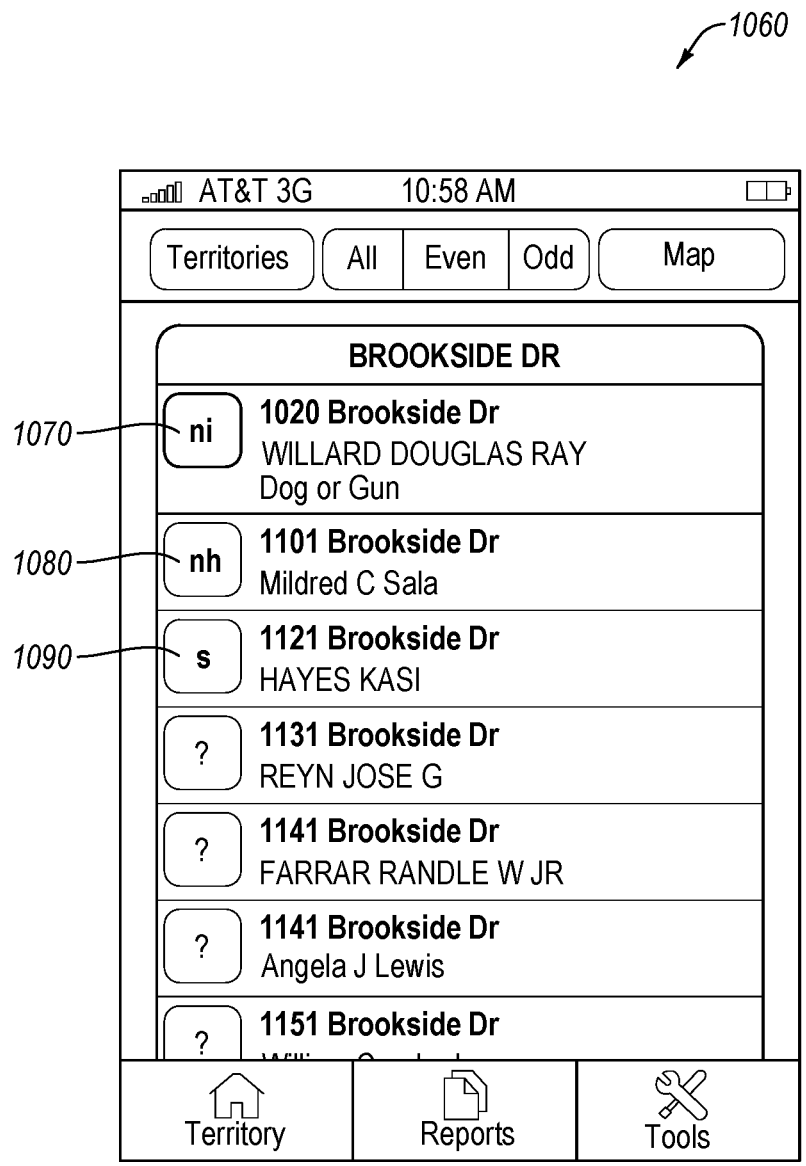
FIG. 25 shows a screenshot of a street sheet screen with multiple results of a sales management tool.
Figure 26:
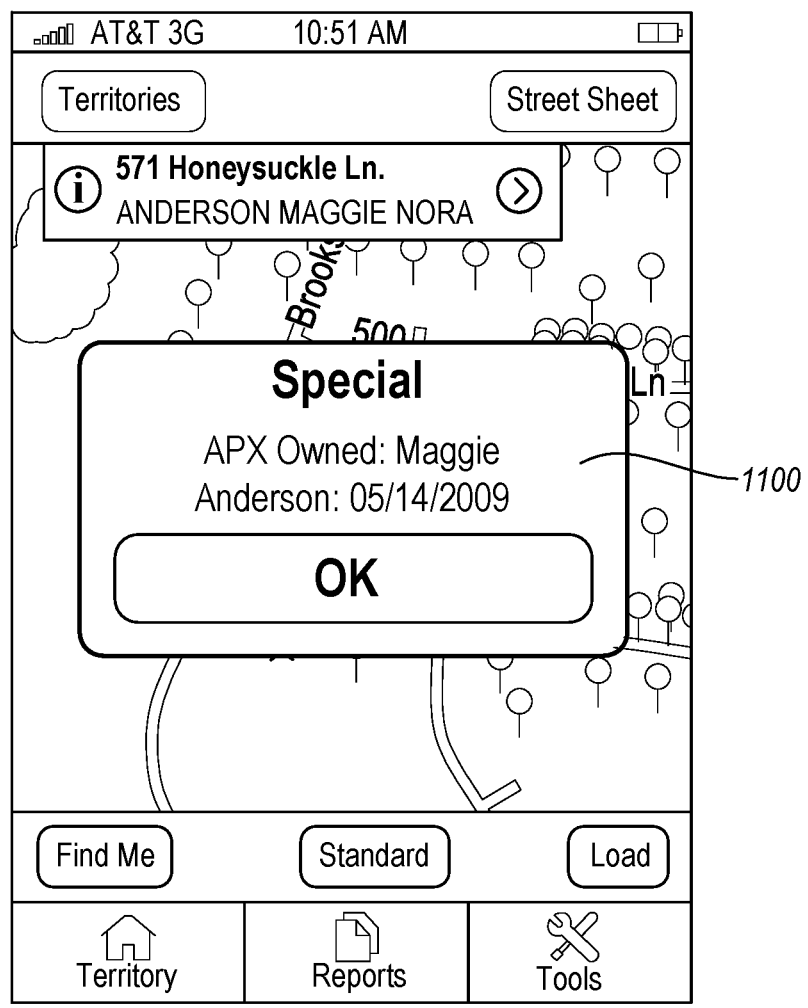
FIG. 26 shows a screenshot of a information popup screen of a sales management tool.

Once, complete, the salesperson may return to the neighborhood listing, as shown in FIG. 25. Here, the updated street sheet 1060 has been updated with the sales person's activity. The first home 1070 remains marked as not interested with a reason of a dog or gun. The second home 1080 was marked as not home and the recently completed sale 1090 was marked as well.

The system may also contain logic to prevent salespeople from performing unauthorized action. For instance, if the sales person tries to request for information on a current customer, the system may show an error message pop-up 1100 such as in FIG. 26. Similar restrictions may apply for other homes or information. For instance, the system may prevent contact with people who declared they were not interested for a period of time, such as one year. It may also prevent contact with people known to be under contract with another company until the contract is up. The system may also provide safety warnings, such as entering a dangerous neighborhood or attempting a sales call on a previously marked violent or threatening homeowner.

Figure 27:
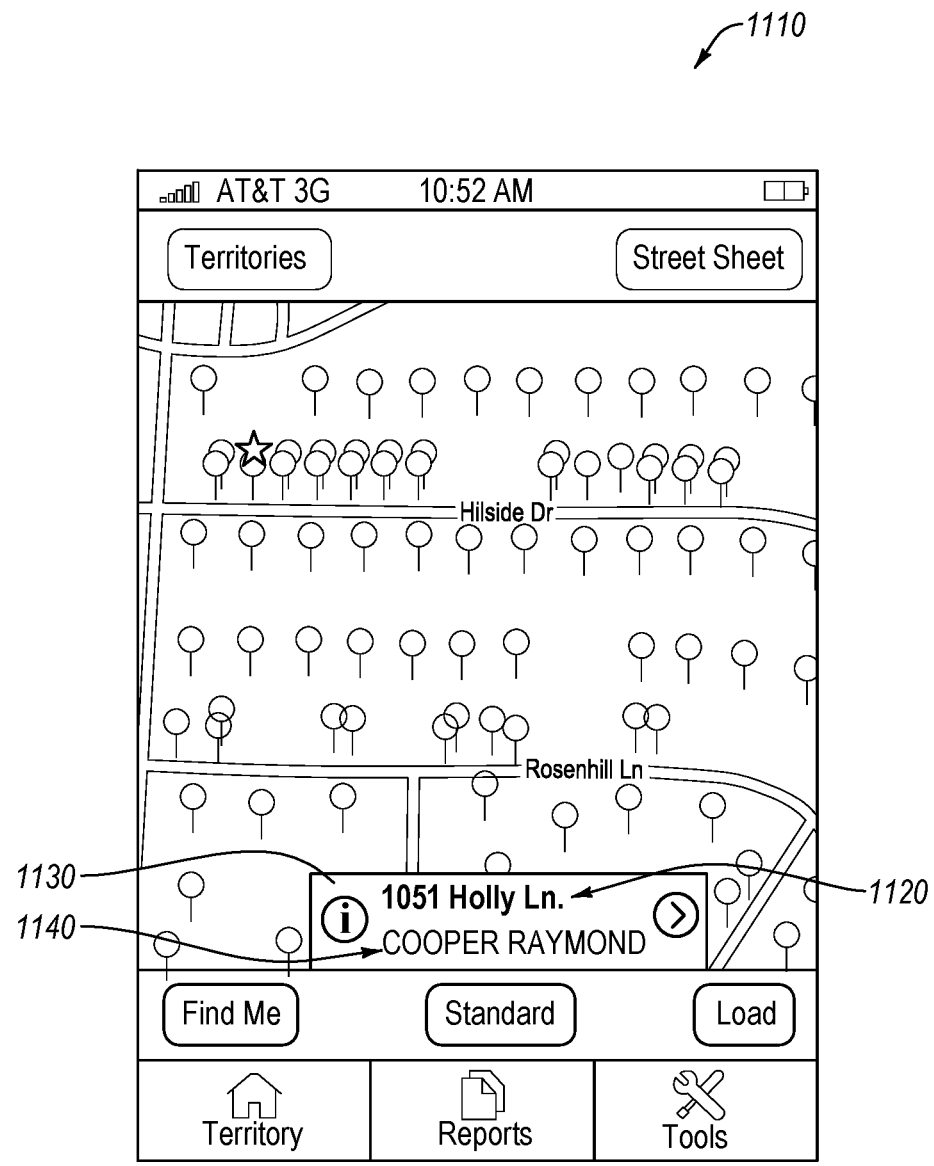
FIG. 27 shows a screenshot of a location finding map screen of a sales management tool.

The system may also allow the salesperson to search and/or scroll through homes and/or owner names. FIG. 27 shows a screenshot of a house id map screen 1110 marking a currently identified home 1120 with an address listing 1130 and homeowner name 1140.

The system may also allow the salesperson or sales manager to run reports and/or receive reports on their mobile device. As seen FIG. 28, a breakout report 1150 may contain information on the total number of doors attempted 1160, the number of people who answered 1170, the number of people passing pre-qualification 1180, the passing rate for pre-qualification 1190, the number of sales 1200, the number of credits 1210, the number of credits per sale 1220, the number of credits that pass 1230, the passage rate of credits 1240, the rate of closing in gross 1250 and net 1260, and rate of closing for those that pre-qualify 1270. These statistics may be adjusted by various ranges, including date, time of day, day of week, salesperson, group of sales people, neighborhood, proximity to event (such as recent crime) or other ranges.

Figure 29:
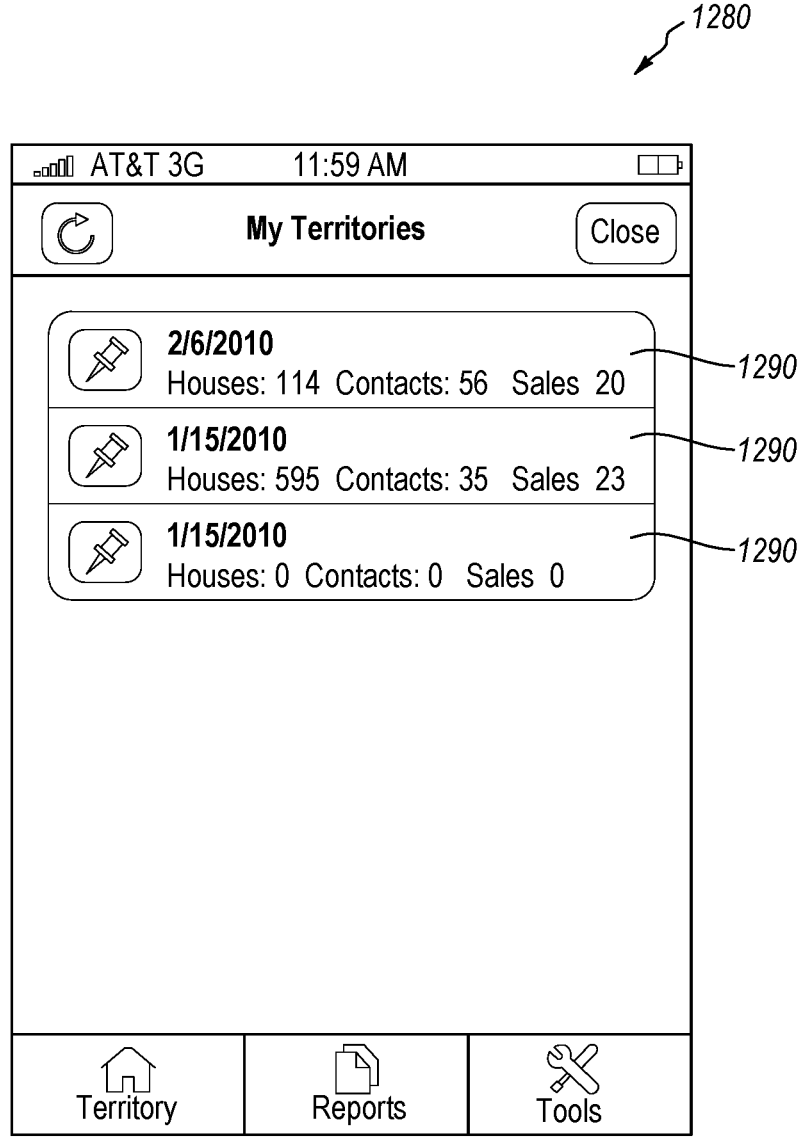
FIG. 29 shows a screenshot of a territory report screen of a sales management tool.
Figure 30:
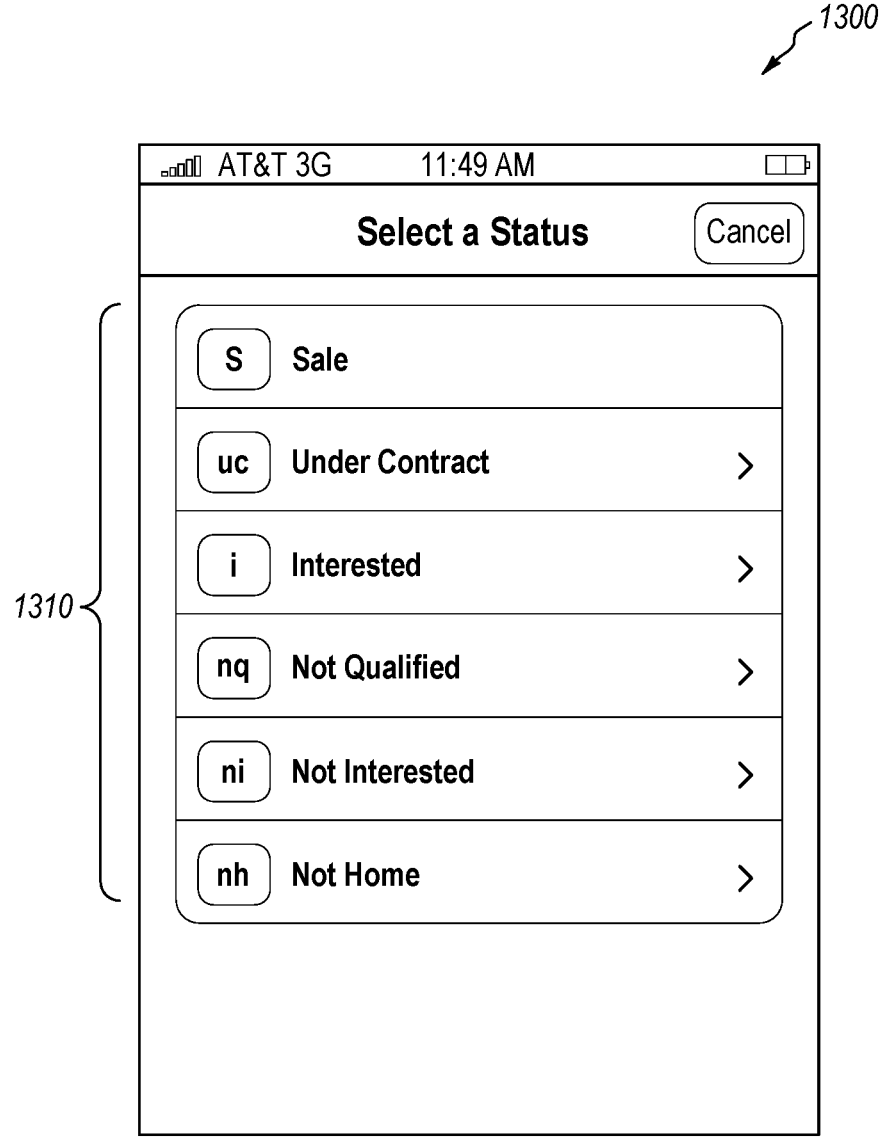
FIG. 30 shows a screenshot of a status request report screen of a sales management tool.
Figure 31:
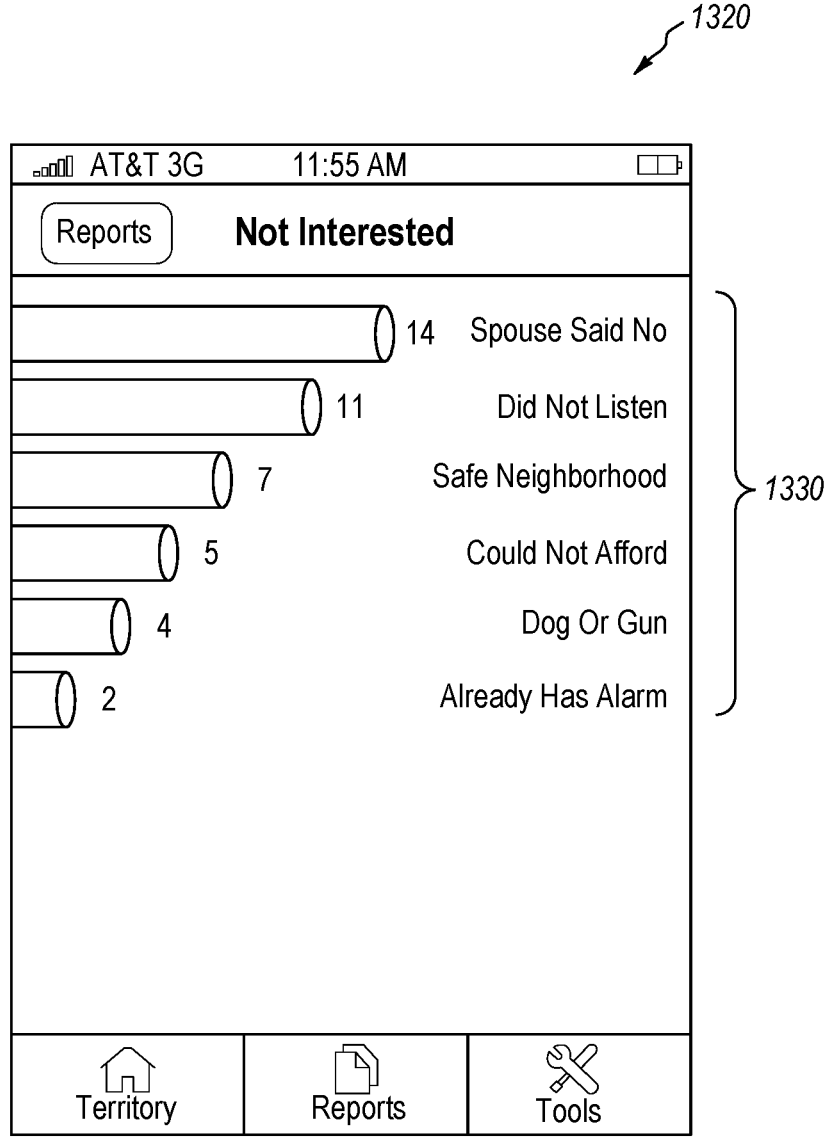
FIG. 31 shows a screenshot of a status of not interested report screen of a sales management tool.
Figure 32:
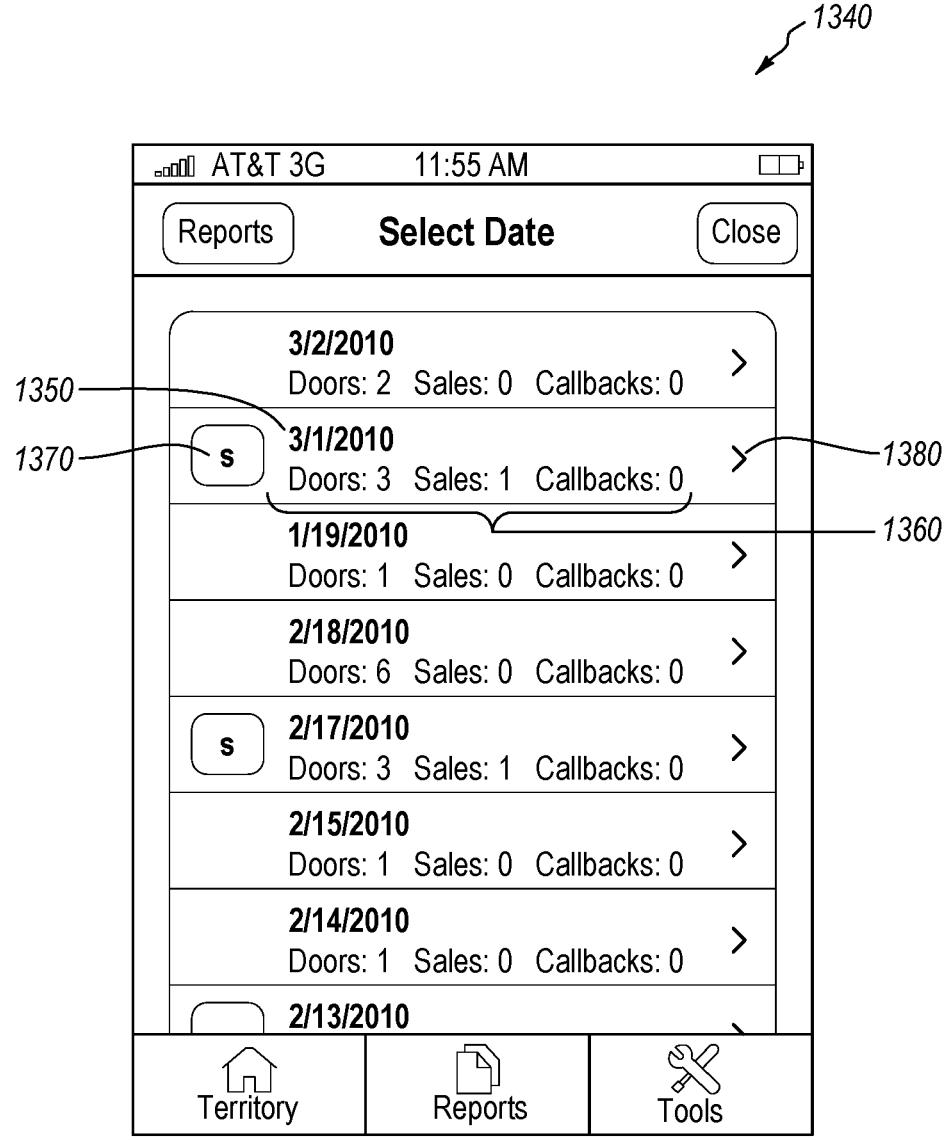
FIG. 32 shows a screenshot of a date report screen of a sales management tool.

Various sub-reports may be selected and viewed as well. FIG. 29 shows a summary statistics screen 1280 for a sales manager's various territories, which may drill down into further sub-reports 1290. For example, a sub-report selection screen 1300 may include a report based on house status 1310 as seen in FIG. 30. A sales manager may review a graphing screen 1320 of the more common "not interested" status reasons 1330 as shown in FIG. 31 and arrange training to overcome the reasons. The reports may contain various granularity and summary screens. For instance, a sales manager or sales person may browse the sales by date. In FIG. 32, a sales person may browse their sales history by date in a sales browsing screen 1340. Each date 1350 shows summary statistics 1360 for that day along with a sales icon 1370 identifying days with sales.

It should be recognized that screens and reports may be linked. For instance, in FIG. 32, the statistics are summarized for each date. However, a sales person or manager may select the arrow 1380 to drill down further into the report and see more granular results.

Figure 33:
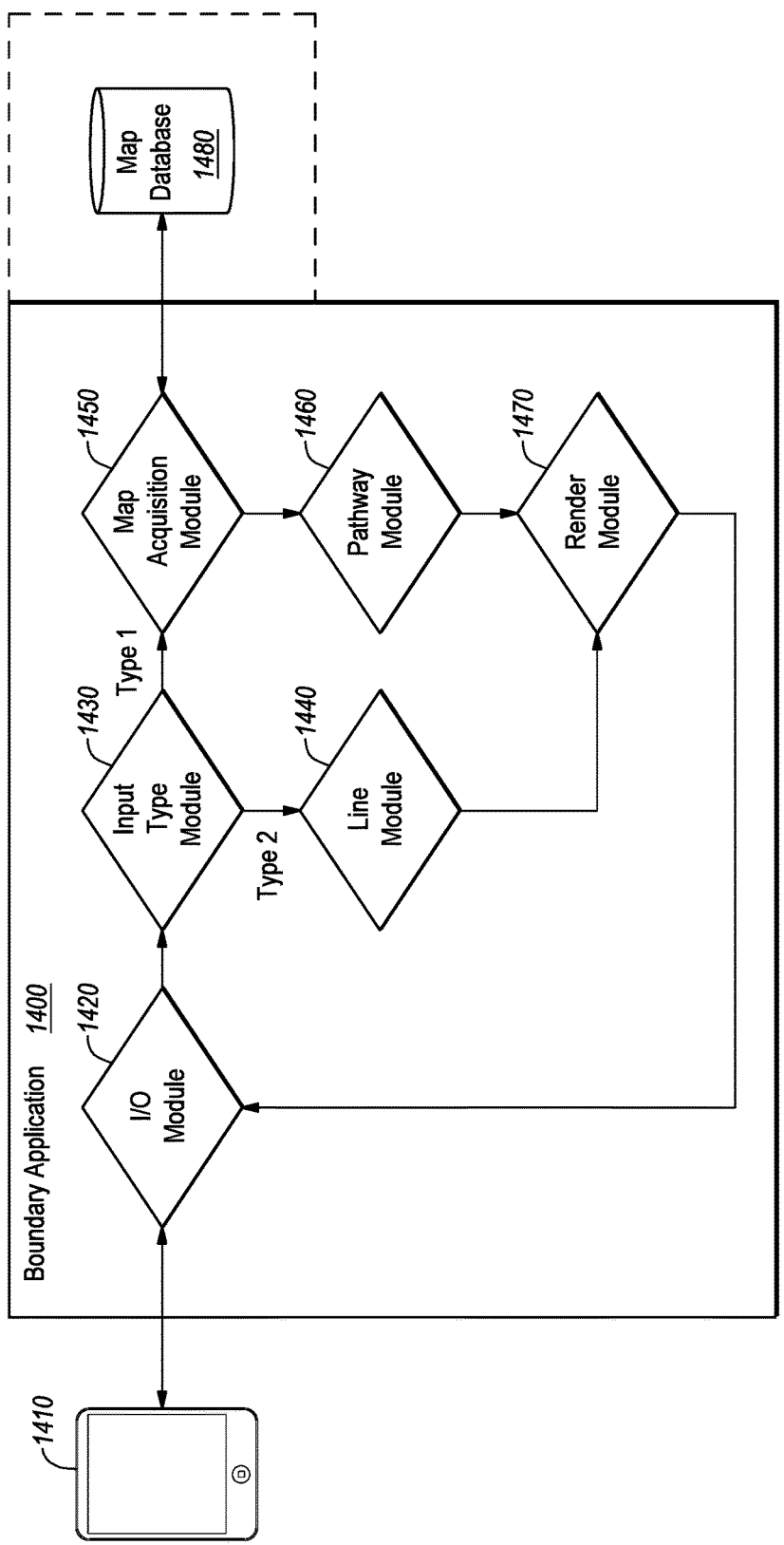
FIG. 33 shows a schematic diagram of a boundary application.

Various additional implementations of the present invention can also comprise a computer system for visually dividing geographic areas among sales teams. As depicted in FIG. 33, the computer system can comprise a boundary application 1400 that is configured to divide geographic areas using novel and innovative interface actions. For example, the boundary application 1400 can be configured to display on a digital interface 1410 a visual depiction of a map. The digital interface 1410 may comprise a touch screen on a mobile phone or tablet, a computer display, or any other digital display. Additionally, in at least one implementation, the digital interface 1410 can also comprise a built-in input means, such as a capacitive or resistive touch display. Alternatively, or additionally, the digital interface 1410 may also comprise external input devices such as a computer mouse or keyboard.

The map displayed by the digital interface 1410 may depict one or more streets. In at least one implementation, the digital interface 1410 can receive, from a user, one or more indications defining boundaries of a first geographic area within the map. The received one or more indications may be received and processed by an I/O module 1420 within the boundary application 1400. The I/O module 1420 may determine the type of interaction associated with each received indication. For example, the I/O module 1420 can detect a physical interaction with the touch interface that is associated with an intensity variable indicating an intensity of the physical interaction. In various implementation, the intensity can be a measure of the force associated with the physical interaction, the duration of the physical interaction, the frequency of the physical interaction, or any other similar measure of intensity that can be detected by the digital interface 1410.

In at least one implementation, an input type module 1430 can perform specific actions based upon the type or level of intensity detected by the I/O module 1420. For instance, the input type module 1430 may be configured to store or otherwise access an intensity variable associated with each respective physical interaction. The input type module 1430 can distinguish between input types based upon the level of force used to interact with the digital interface 1410. For example, the input type module 1430 can interpret a detected physical interaction that is below a threshold level of force as being a first type of input, while a physical interaction that exceeds the threshold level of force can be interpreted as a second type of input. Similarly, the input type module 1430 can interpret physical interactions that are below a threshold amount of time as being a first type of input, while interactions that exceed a threshold amount of time are interpreted as being a second type of input. Accordingly, the input type module 1430 can distinguish between inputs on the map based upon the physical characteristics of the input.

Figure 34:
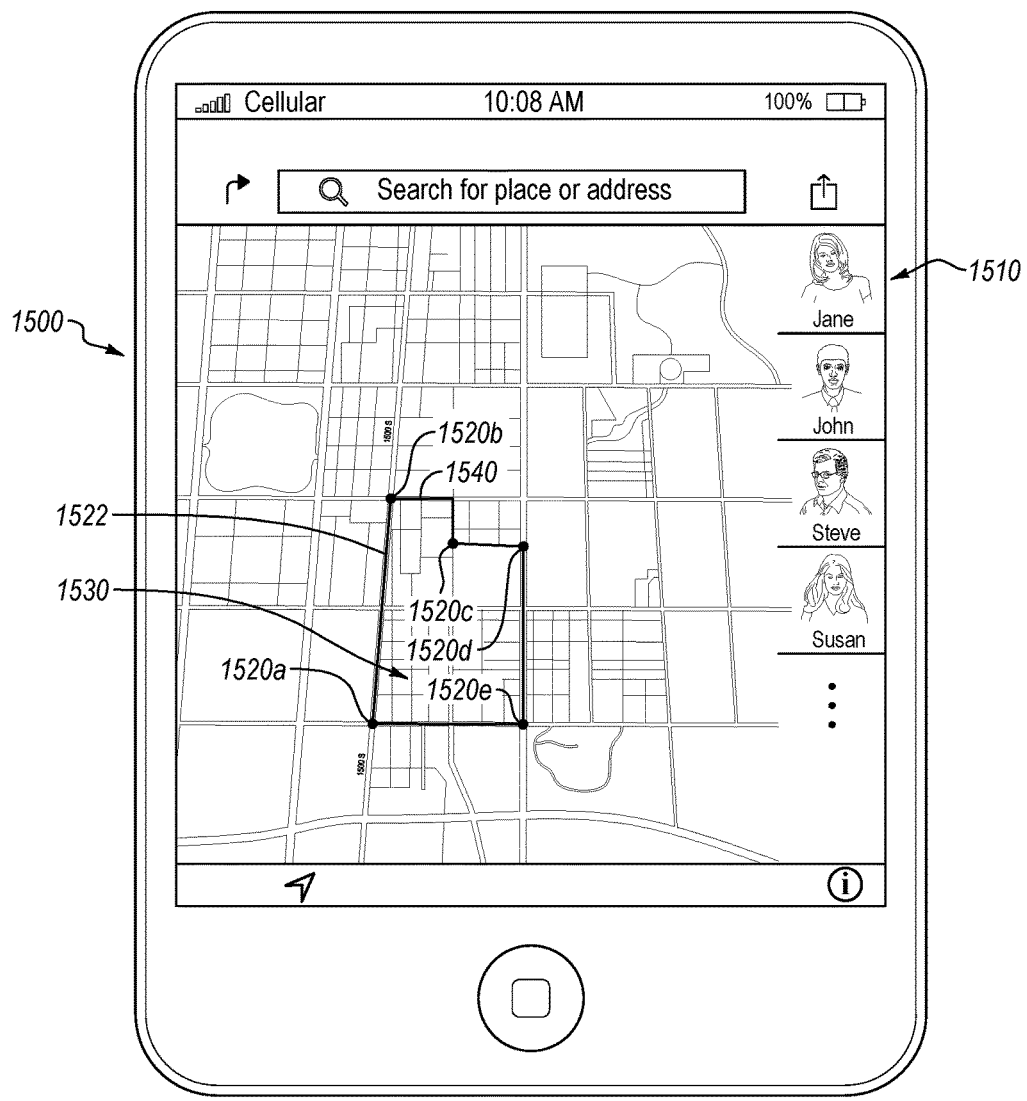
FIG. 34 shows a screenshot of a boundary creation interface.

In addition to detecting an intensity of an interaction, the I/O module 1420 can also identify a geographic position within the visual depiction of the map that is associated with a location of the physical interaction. For example, FIG. 34 depicts a map 1500 on a digital interface 1410. The digital interface 1410 also displays a user selection portion 1510 that displays various users that are associated with the boundary application 1400.

Various physical interactions with the map 1500 are displayed through dots 1520(*a-e*) that indicate both a location of a physical interaction with the digital interface 1410 and an intensity of the interaction. For example, the interaction points 1520(*a-e*) of FIG. 34 are depicted as relatively smaller than the interaction points 1550(*a-e*) of FIG. 35. The size of the interaction points 1520(*a-e*), 1550(*a-e*) indicates an intensity associated with each respective physical interaction. One will understand that the use of dots and relative size differences is provided for the sake of clarity and example and is not meant to limit implementations of the present invention.

In FIG. 34, a first physical interaction is detected at dot 1520*a*. A second physical interaction may then be detected at dot 1520*b*. As explained above, after each physical interaction, the input type module 1430 can determine the type of interaction based upon the intensity variable associated with each physical interaction. As depicted, both physical interaction 1520*a* and physical interaction 1520*b* can comprise physical interactions that do not exceed a particular threshold of force, time, frequency, or other measure of intensity.

Based upon the determination that the respective physical interactions do not exceed a pre-determined threshold, the input type module 1430 can determine that the input is a "type 1" input as indicated in FIG. 33. Upon identifying each input as a type 1 input, a map acquisition module 1450 can access data relating to the displayed map 1500 from a map database 1480. As indicated by the dashed lined surrounding the map database, in various implementations the map database may be hosted local to the user assignment application or remotely, in part or in whole. Using information from the map database 1480, the map acquisition module 1450 can determine a first road intersection that is nearest to the epicenter of the first physical interaction 1520*a* and a second road intersection that is nearest to the epicenter of the second physical interaction 1520*b*.

The map acquisition module 1450 can then send the first road intersection information and the second road intersection information to the pathway module 1460. In at least one implementation, the pathway module 1460 can then identify the shortest pathway, following roads, between the first road intersection and the second road intersection. The pathway module 1460 can send the shortest pathway to the render module 1470. The render module 1470 can then render on the visual depiction of the map 1500 a first boundary line that follows the shortest pathway between the first intersection and the second intersection.

The depicted boundary 1522 between the first intersection and the second intersection comprises a straight line because the shortest pathways followed the road that links the first intersection and the second intersection. In contrast, the boundary 1540 between physical interaction 1520*b* and and 1520*c* comprises a turn. In this case, the physical interactions 1520*b*, 1520*c* were not on the same road, so the pathways module 1460 determined that the shortest pathway between the respective physical interactions 1520*b*, 1520*c* involved a turn.

Figure 35:
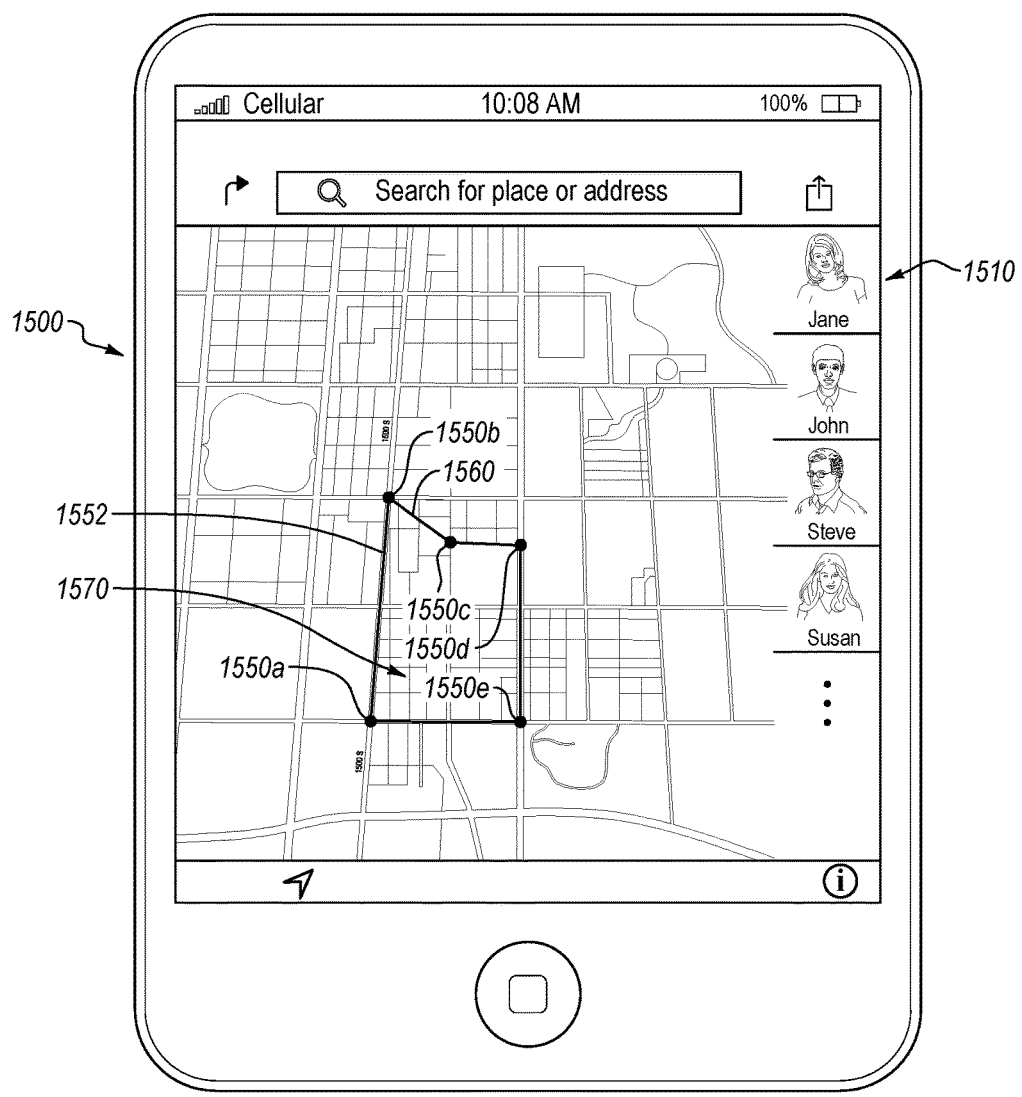
FIG. 35 shows another screenshot of a boundary creation interface.

FIG. 34 depicts five total interaction points 1520(*a-e*) that when processed by the boundary application 1400 form an enclosed boundary around the first geographic area 1530. As described and depicted each of the physical interactions 1520(*a-e*) with the digital interface were of a first type. In contrast, FIG. 35 depicts physical interactions 1550(*a-e*) of the second type. In particular, the physical interactions 1550(*a-e*) are depicted with large dots—indicating a greater intensity of physical interaction. The input module 1430 can identify the physical interactions 1550(*a-e*) as being from the second type based upon each respective interaction being associated with an intensity variable that exceed a predetermined threshold.

In at least one implementation, upon determining a particular physical interaction (e.g., 1550*a*) is a second type of interaction, the line module 144 can calculate a straight line between two respective interaction points (e.g., 1550*a* and 1550*b*). The render module 1470 can then render the visual depiction of the first boundary 1552 as a straight line between interaction points 1550*a* and 1550*b*.

For example, both physical interactions point 1550*b* and 1550*c* are both of the second type. As such, a boundary line 1560 is rendered as a straight line between the two respective points 1550*b*, 1550*c*. The boundary line 1560 does not follow roads and bisects several neighborhoods. As comparison, the equivalent boundary line 1540 of FIG. 34 follows the shortest route on roads to form a boundary.

FIG. 35 depicts five total interaction points 1550(*a-e*) that when processed by the boundary application 1400 form an enclosed boundary around a different first geographic area 1570 than depicted in FIG. 34. As described and depicted each of the physical interactions 1520(*a-e*) with the digital interface were of a second type, which resulted in a different geographic area 1570 than geographic area 1530 depicted in FIG. 34—even though the respective physical interactions 1520(*a-e*), 1550(*a-e*) were detected in the same locations.

Each of the above described and depicted interactions, interaction types, and boundaries are provided for the sake of clarity and example. For example, in various implementations, an interaction that is below a particular threshold can be identified as a second type of interaction that is associated with a straight-line boundary. Similarly, the intensity variable can be associated with a wide variety of different interaction measurements, including, but not limited to, duration of interaction, force of interaction, frequency of interaction, etc.

Additionally, in at least one implementation, a user can create the boundaries for a single geographic area using a combination of interaction types. For example, in at least one implementation, an initial type 2 interaction, followed by any other type of interaction will result in a straight line being rendered between the initial interaction and the other interaction. In contrast, in at least one implementation, the later interaction determines the interaction type. For instance, an initial type 2 interaction followed by a type 1 interaction can result in a shortest-pathway-along-roads boundary being rendered between the two respective interaction points. Accordingly, implementations of the present invention provide a great deal of flexibility in creating boundary points around a geographic area.

Figure 36:
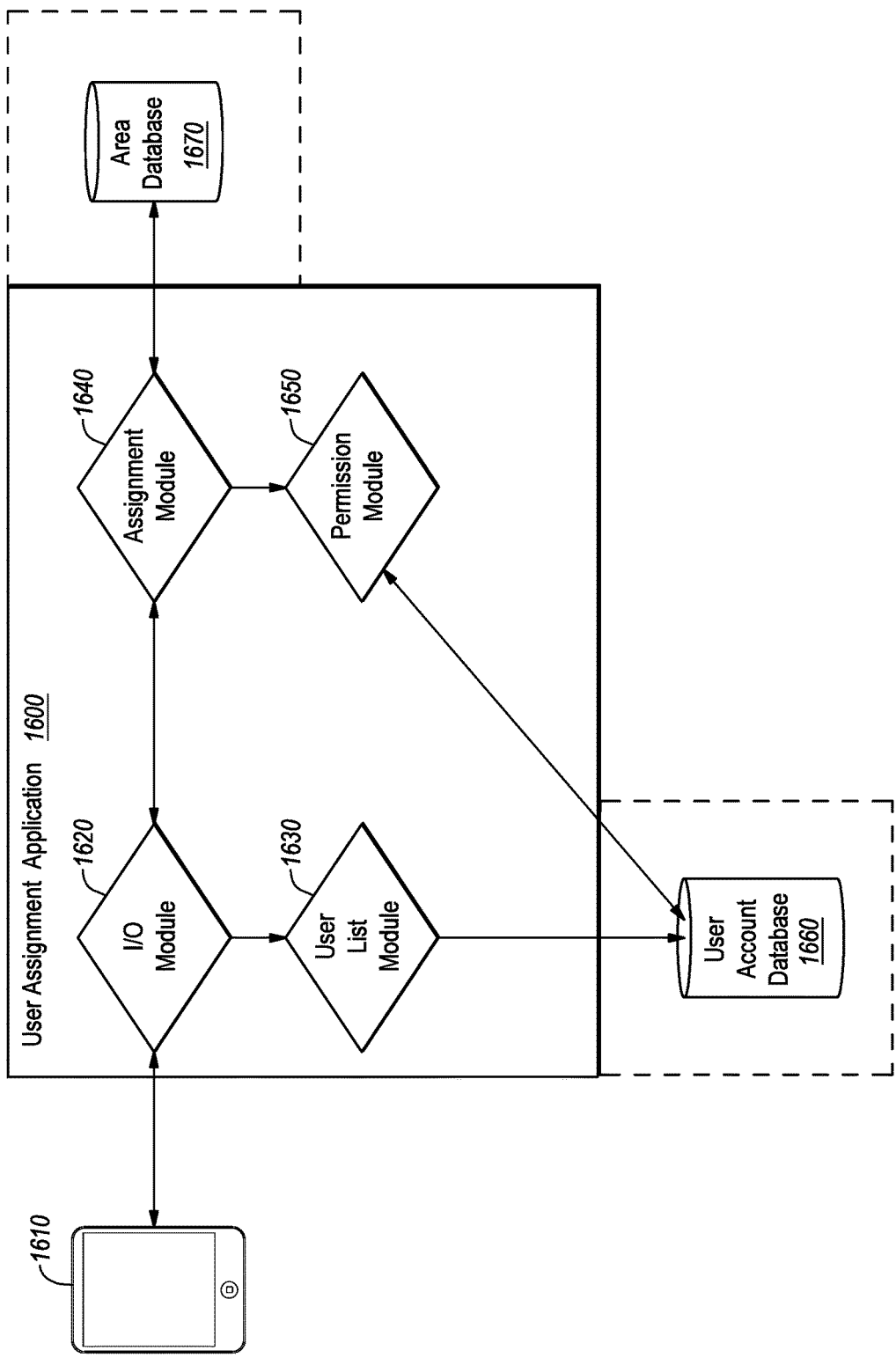
FIG. 36 shows a schematic diagram of a user assignment application.

Turning now to FIG. 36, in at least one implementation, once a boundary for the first geographic area on the map has been created, a user assignment application 1600 can be configured to assign a first user to the first geographic area. The user assignment application 1600 may be integrated within the same system and/or software application as the boundary application 1400.

For example, using methods and systems described more fully below, the user assignment application 1600 may comprise an I/O module 1620. In at least one implementation, the I/O module 1620 of FIG. 36 is the same I/O module 1420 as FIG. 33. The I/O module can communicate detected inputs to an assignment module 1640 that assigns a particular user to a particular geographic area.

The assignment module 1640 may be in communication with an area database 1670, which describes each geographic area associated with the user assignment application 1600, and a permissions module 1650 that controls permissions associated with the multiple individual geographic areas. As indicated by the dashed lined surrounding the area database, in various implementations the area database may be hosted local to the user assignment application or remotely, in part or in whole. The permissions module 1650 may be in communication with a user account database 1660 that stores user accounts for users that are associated with the user assignment application 1600. As indicated by the dashed lined surrounding the user account database, in various implementations the user account database may be hosted local to the user assignment application or remotely, in part or in whole. Each user account within the user account database 1660 may be associated with a permissions attributes that determines what permissions each respective user has with respect to various geographic areas.

Figure 37:
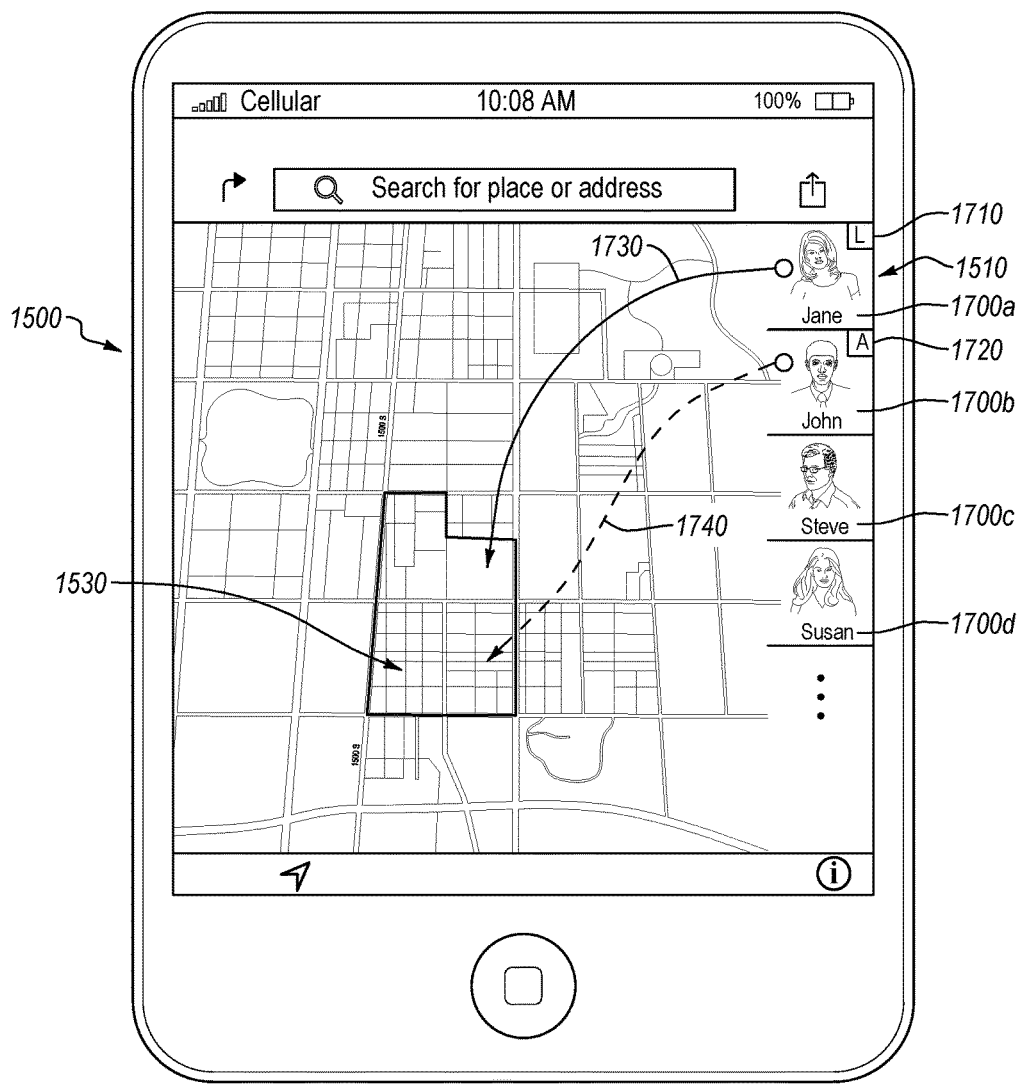
FIG. 37 shows a screenshot of a user assignment interface.

For example, FIG. 37 depicts a user interface displaying the map 1500 depicted in FIGS. 34 and 35. In at least one implementation, in addition to displaying the map 1500, the I/O module 1620 can also display a user selection portion 1510. The user selection portion 1510 can be displayed based upon information that the I/O module 1620 receives from a user list module 1630, which is in communication with the user account database 1660. In at least one implementation, the user list module 1630 can identify all of the users that are associated with the user assignment application 600 and display those users, through the I/O module 1620, on the user interface.

While the user selection portion 1510 may be depicted in a variety of different ways, in FIG. 37 the user selection portion 1510 displays a photograph and name associated with each user 1700(*a-d*). Additionally, the user selection portion 1510 also displays badges 1710, 1720 associated with various users 1700(*a-d*). The badges 1710, 1720 can indicate a permission attribute associated with each respective user.

In at least one implementation, an operator of the user assignment application 1600 can assign a particular user to a geographic area by physically associating a visual indicator representative of the first user 1700*a* with a visual indicator representative of the first geographic area 1530 through a touch interface. For example, the operator can drag-and-drop the visual indicator associated with the first user 1700*a* from the user selection portion 1510 to the first geographic area 1530 displayed on the map 1500. In another implementation, the operator can first select the visual indicator associated with the first user 1700*a* from the user selection portion 1510 and then select the first geographic area 1530 displayed on the map 1500.

Once the first user 1700*a* has been associated with the first geographic area 1530, the assignment module 1640 can assign the first user 1700*a* to the first geographic area 1530. In at least one implementation, the assignment module 1640 can access, from within the user account database 1660, a permission attribute that is associated with a user account of the first user 1700*a*. The assignment module 1640 can then configure the permission attribute to give the first user 1700*a* editing rights for the first geographic area 1530. The editing rights can allow the first user 1700*a* to further sub-divide the first geographic area 1530 and assign other users to the respective sub-divisions. For example, in at least one implementation, the first user 1700*a* can create a sub-division within the first geographic area 1530, using the same methods described above, and assign a second user 1700*b* to the sub-division within the first geographic area 1530. In at least one implementation, the first user 1700*a* can assign a second user 1700*b* to the entire first geographic area 1530 without subdividing the area 1530.

The first user 1700*a* can assign the second user 1700*b* to the first geographic area 1530 by physically associating a visual indicator representative of the second user 1700*b* with a visual indicator representative of the first geographic area 1530 through a touch interface. In at least one implementation, the permissions module 1650 can configure a permission attribute associated with the second user 1700*b* to give the second user access to information relating to the first area 1530; however, the permissions module 1650 can configure the permission attribute such that the second user 1700*b* is prevented from editing or further subdividing the first geographic area 1530.

The badges 1710, 1720 depicted within the user selection portion 1510 may indicate, at least in part, the permission attribute that is associated with each respective user. For example, badge 1710 associated with the first user 1700*a* depicts an "L." In at least one implementation, the "L" may indicate that the first user 1700*a* is a leader or lead for a geographic area. As such, the first user 1700*a* can subdivide and assign other users to the geographic area 1530.

In contrast, the badge 1720 associated with the second user 1700*b* depicts an "A." In at least one implementation, the "A" may indicate that the second user 1700*b* is an associate within the geographic area. As such, the second user 1700*b* can access information associated with the first geographic area 1530, but is unable to subdivide or assign other users to the area 1530.

In at least one implementation, the permissions attribute can also be utilized when assigning referrals from specific geographic areas to a particular user. For example, in at least one implementation, all referrals for houses within the first geographic region can be automatically sent to the first user. In contrast, in at least one implementation, referrals are sent to the user that is assigned to the sub-divided area that contains the house (e.g., the second user).

Figure 38:
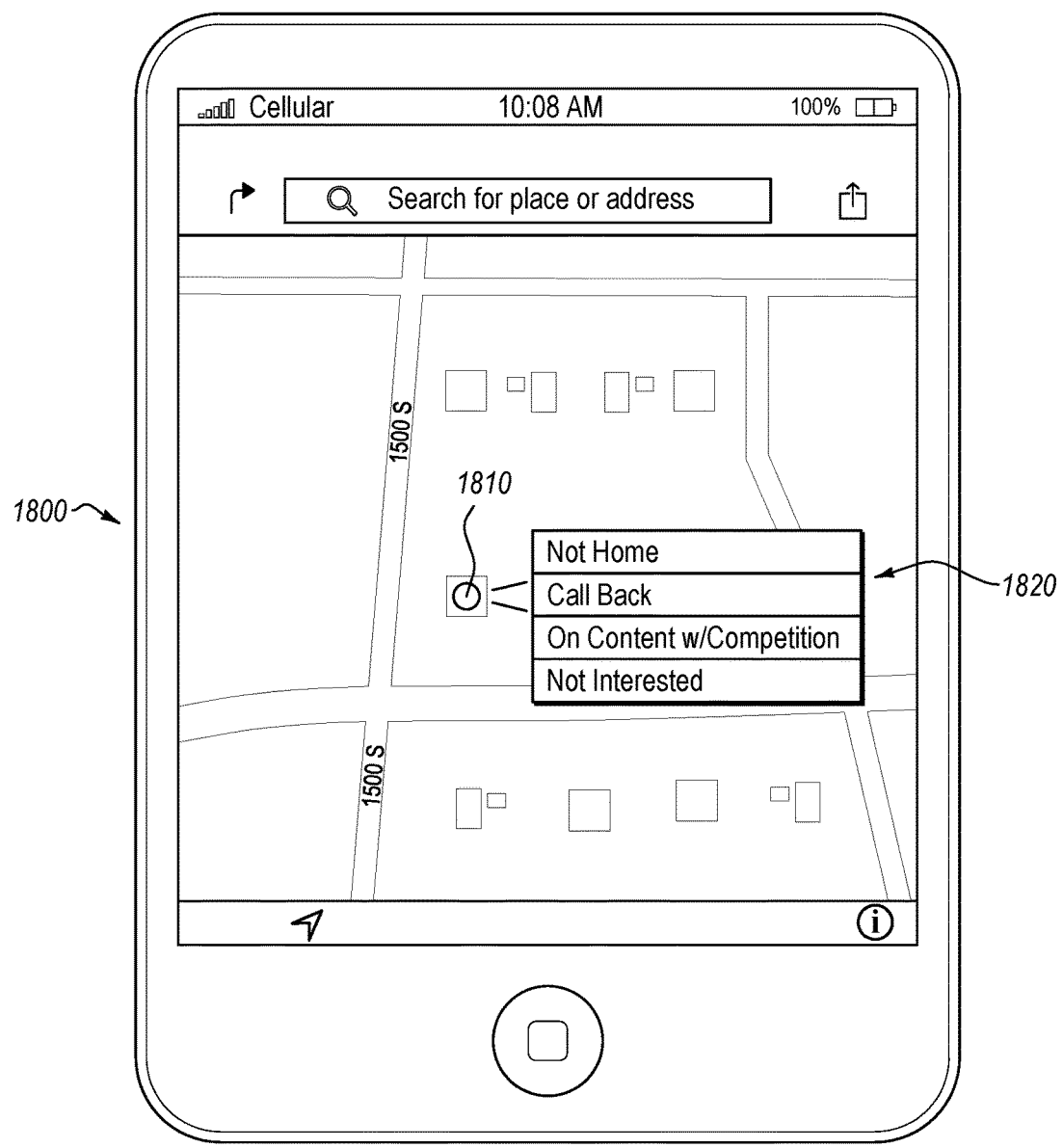
FIG. 38 shows a screenshot of an house information interface.

FIG. 38 depicts an exemplary user interface 1800 of a neighborhood within the first geographic region 1530 of FIGS. 34, 35, and 37. In particular, the user interface displays within the visual depiction of the map a visual indication of one or more houses. In at least one implementation, a user can gather information from the interface 1800 by selecting a particular house 1810. For example, the user interface 1800 can detect a physical interaction with the touch interface. The physical interaction can comprise a physical selection of a particular house. The physical interaction may be further distinguishable by an associated intensity.

In at least one implementation, upon detecting a physical interaction with the touch interface, the permissions module 1650 can access a user login credential within the user account database 1660. The user login credential can include a user name associated with a current user of the system. Additionally, the permissions module 1650 can identify an area permission associated with the current user of the system. For example, the permissions modules 1650 can identify all of the geographic areas that the second user 1700*b* has permission to access and/or edit.

Additionally, the permissions module 1650 can determine whether the particular house 1810 is located within an area to which the area permission grants the current user access. For instance, the permissions module 1650 can determine whether the second user 1700*b* has permissions to view information associated with the house 1810. If it is determined that the second user 1700*b* has sufficient permissions, the user interface 1800 can display an interactive classification menu 1820 that comprises various user-selectable classifications for the particular house. The user-selectable classifications allow a user to quickly and easily categorize a house based upon the user's visit to the home. In contrast, if it is determined that the second user lacks permissions to view the information, the user interface 1800 can display a warning.

Accordingly, FIGS. 1-38 and the corresponding text illustrate or otherwise describe one or more components, modules, and/or mechanisms for sales management software, including geographic management software. In particular, in at least one implementation, the present invention can provide innovative means for dividing geographic areas between various users. Additionally, implementations of the present invention can assign and enforce permission among the various users to prevent users from accessing information outside of their respective assigned geographic areas. For example, FIG. 39 describes acts in a method for managing geographic areas within a sales management software application. The acts of FIG. 39 are described below in connection with the schematics and components of FIGS. 1-38.

Figure 39:
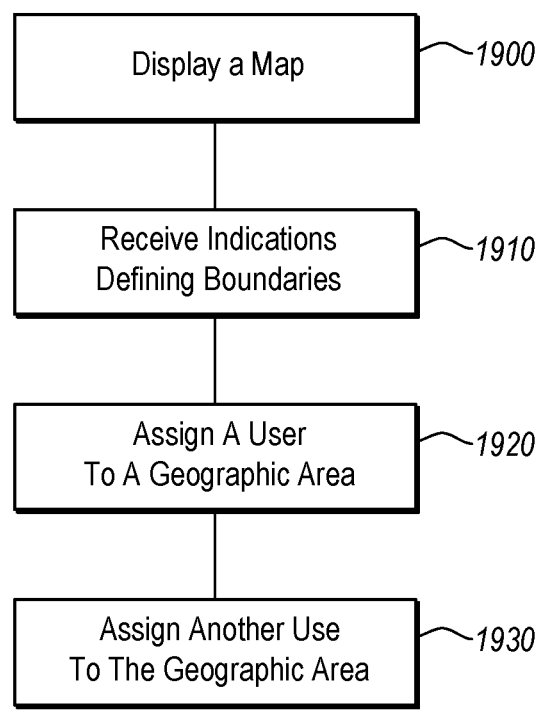
FIG. 39 shows a flowchart of a method in accordance with implementations of the present invention.

For example, FIG. 39 illustrates that a method for managing geographic areas and users within a sales management software application can include an act 1900 of displaying a map. Act 1900 can comprise displaying on a digital interface a visual depiction of a map, wherein the map displays one or more streets. For example, as depicted and described with respect to FIGS. 34, 35, 37, and 38, a digital interface can display a map 1500. The displayed map may be accessed based upon GPS data associated with the location of the current user or may be otherwise accessed through conventional search functions.

Additionally, FIG. 39 illustrates that the method can include an act 1910 of receiving indications defining boundaries. Act 1910 can comprise receiving one or more indications defining boundaries of a first geographic area within the map. For example, as depicted and described with respect to FIG. 34, the digital interface 1410 can receive physical interactions through a touch-interface that define boundaries of a geographic region 1530 on the map.

FIG. 39 also illustrates that the method can include an act 1920 of assigning a user to a geographic area. Act 1920 can further comprise receiving a physical association of a visual indicator representative of the first user with a visual indicator representative of the first geographic area through a touch interface. For example, as depicted and described with respect to FIG. 37, a user can drag-and-drop the visual indicator of the first user 1700*a* to the visual indicator of the first geographic area 1530.

Additionally, Act 1920 can comprise an act of accessing a permission attribute that is associated with a user account of the first user. For example, as depicted and described with respect to FIG. 36, the permissions module 1650 can access a permission attribute associated with the first user from the user account database 1660. Act 1920 can further comprise an act of configuring the permission attribute to give the first user editing rights for the first geographic area. The editing rights can allow the first user to further sub-divide the first geographic area and assign a second user to the respective sub-divisions. For example, the permission module 1650 described in FIG. 36 can configure the permission attribute within the user account database 1660 to give the first user permission to edit and sub-divide the first geographic area. The first user can then assign a second user to a sub-divided region within the first geographic area, as indicated by act 1930.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some embodiments, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system for managing divided geographic areas among sales teams comprising:
    one or more processors; and
    one or more computer-readable media having stored thereon executable instructions that when executed by the one or more processors configure the computer system to perform at least the following:
        transmit to a remote computing device a visual depiction of a map, wherein the map displays one or more streets;
        receive a first touch indication on a touch-sensitive digital interface displaying the visual depiction of the map, the first touch indication received through a touch of a first geographic position on the visual depiction of the map;
        receive a second touch indication on the touch-sensitive digital interface displaying the visual depiction of the map, the second touch indication received through a touch of a second geographic position on the visual depiction of the map;
        receive an intensity variable associated with a force of a touch received from a user in association with a first boundary line extending from the first geographic position to the second geographic position;
        when it is determined that the intensity variable is of a first magnitude, generate the visual depiction of the map with the first boundary line defined as being a straight line between the first geographic position and the second geographic position on the visual depiction of the map, wherein the first boundary line does not follow roads and bisects neighborhoods;
        when it is determined that the intensity variable is of a second magnitude, generate the visual depiction of the map with the first boundary line defined by:
            identifying a point on a road nearest to the first geographic position within the visual depiction of the map,
            identifying another point on another road nearest to the second geographic position within the visual depiction of the map, and
            defining the first boundary line as being a shortest route, following roads, between the point on the road nearest to the first geographic position within the visual depiction of the map and the other point on the other road nearest to the second geographic position within the visual depiction of the map;
        transmit the visual depiction of the map with the first boundary line to the remote computing device;
        receive from the remote computing device one or more indications assigning a first user to a first geographic area that is defined by a boundary that includes the first boundary line, wherein assigning the first user to the first geographic area comprises:
            physically associating a visual indicator representative of the first user with a visual indicator representative of the first geographic area through a touch interface by dragging-and-dropping the visual indicator representative of the first user to the first geographic area, wherein at least one line defining the first geographic area comprises the first boundary line that was defined based upon an intensity variable;
        access a permission attribute that is associated with a user account of the first user; and
        based upon the assignment of the first user to the first geographic area, configure the permission attribute to give the first user editing rights for the first geographic area, wherein the editing rights allow the first user to further sub-divide the first geographic area and assign a second user to the respective sub-divisions.

2. The computer system of claim 1, wherein the executable instructions further include instructions that are executable to configure the computer system to:
    receive from the remote computing device one or more indications defining boundaries of a second geographic area within the map, wherein the second geographic area is located within the first geographic area;
    receive from the remote computing device one or more indications assigning a second user to the second geographic area;
    access a permission attribute that is associated with a user account of the second user, and
    configure the permission attribute to give the second user access to information associated with the second geographic area.

3. The computer system of claim 2, wherein the second user is not given editing rights for the first geographic area.

4. A method, implemented at a computer system that includes one or more processors for visually dividing geographic areas among sales teams, the method comprising:
    displaying on a touch-sensitive digital interface a visual depiction of a map, wherein the map displays one or more streets;
    detecting a first physical interaction with the touch-sensitive digital interface, wherein:
        the first physical interaction touches a first portion of a boundary around a particular geographic area depicted by the map, and
        the first physical interaction is associated with an intensity variable indicating an intensity of the first physical interaction;
    detecting a second physical interaction with the touch-sensitive digital interface, wherein the second physical interaction touches a second portion of the boundary around the particular geographic area depicted by the map;
    when it is determined that the intensity variable is of a first magnitude, generate the visual depiction of the map with a first boundary line defined as being a straight line between the first physical interaction and the second physical interaction on the visual depiction of the map, wherein the first boundary line does not follow roads and bisects neighborhoods;
    when it is determined that the intensity variable is of a second magnitude, generate the visual depiction of the map with the first boundary line defined by:
        identifying a point on a road nearest to a first location of the first physical interaction on the visual depiction of the map, identifying another point on another road nearest to a second location of the second physical interaction on the visual depiction of the map, and defining the first boundary line as being a shortest route, following roads, between the point on the road nearest to a location of the first physical interaction on the visual depiction of the map and the other point on the other road nearest to the location of the second physical interaction on the visual depiction of the map;

rendering on the visual depiction of the map the boundary that encompasses the particular geographic area depicted by the map, wherein the boundary comprises the first boundary line; and assigning a first user to the particular geographic area, wherein assigning the first user to the particular geographic area comprises:

physically associating a visual indicator representative of the first user with a visual indicator representative of the particular geographic area through a touch interface by dragging-and-dropping the visual indicator representative of the first user to the particular geographic area, wherein at least one line defining the first geographic area comprises the first boundary line that was defined based upon an intensity variable.

5. The method as recited in claim 4, wherein assigning a first user to the particular geographic area, comprises:

accessing a permission attribute that is associated with a user account of the first user, and configuring the permission attribute to give the first user editing rights for the particular geographic area, wherein the editing rights allow the first user to further sub-divide the particular geographic area, and assign a second user to the respective sub-divisions.

6. The computer system of claim 4, wherein the first physical interaction is determined to be of the first magnitude when the intensity variable exceeds a particular threshold and the first physical interaction is determined to be of the second magnitude when the intensity variable is below the particular threshold.

7. A computer system for visually dividing geographic areas among sales teams comprising:

one or more processors; and one or more computer-readable media having stored thereon executable instructions that when executed by the one or more processors configure the computer system to perform at least the following:

display on a touch-sensitive digital interface a visual depiction of a map, wherein the map displays one or more streets;

detect a first physical interaction with the touch-sensitive digital interface, wherein:

the first physical interaction touches a first portion of a first boundary line around a particular geographic area depicted by the map, and the first physical interaction is associated with an intensity variable indicating an intensity of the first physical interaction;

detect a second physical interaction with the touch-sensitive digital interface, wherein:

the second physical interaction touches a second portion of the first boundary line around the particular geographic area depicted by the map;

when it is determined that the intensity variable is of a first magnitude type, generate the visual depiction of the map with the first boundary line defined as being a straight line between the first physical interaction and the second physical interaction on the visual depiction of the map, wherein the first boundary line does not follow roads and bisects neighborhoods;

when it is determined that the intensity variable is of a second magnitude, generate the visual depiction of the map with the first boundary line defined by:

identifying a point on a road nearest to a first location of the first physical interaction on the visual depiction of the map, identifying another point on another road nearest to a second location of the second physical interaction on the visual depiction of the map, and defining the first boundary line as being a shortest route, following roads, between the point on the road nearest to the first location of the first physical interaction on the visual depiction of the map and the other point on the other road nearest to the second location of the second physical interaction on the visual depiction of the map;

render on the visual depiction of the map a boundary that encompasses the particular geographic area depicted by the map, wherein the boundary comprises the first boundary line;

assign a first user to the particular geographic area, wherein assigning the first user to the particular geographic area comprises:

physically associating a visual indicator representative of the first user with a visual indicator representative of the particular geographic area through a touch interface by dragging-and-dropping the visual indicator representative of the first user to the particular geographic area, wherein at least one line defining the particular geographic area comprises the first boundary line that was defined based upon an intensity variable;

access a permission attribute that is associated with a user account of the first user; and based upon the assignment of the first user to the particular geographic area, configure the permission attribute to give the first user editing rights for the particular geographic area, wherein the editing rights allow the first user to further sub-divide the particular geographic area and assign a second user to the respective sub-divisions.

8. The computer system of claim 7, wherein an intensity of the first physical interaction with the touch interface comprises an indication of a duration of first physical interaction or an indication of a force of interaction.

9. The computer system of claim 7, wherein the first physical interaction is determined to be of the first magnitude type when the intensity variable exceeds a particular threshold and the first physical interaction is determined to be of the second magnitude when the intensity variable is below the particular threshold.

* * * * *